United States Patent [19]

Maida et al.

[11] Patent Number: 4,494,851

[45] Date of Patent: Jan. 22, 1985

[54] DISPLAY UNIT FOR FLASHLIGHT PHOTOGRAPHY

[75] Inventors: Osamu Maida; Hiroshi Hasegawa; Nobuyoshi Hagyuda, all of Tokyo; Yoshikazu Iida, Chigasaki, all of Japan

[73] Assignee: Nippon Kogaku K.K., Tokyo, Japan

[21] Appl. No.: 436,430

[22] Filed: Oct. 25, 1982

[30] Foreign Application Priority Data

Oct. 31, 1981 [JP] Japan ................................. 56/174925
Oct. 31, 1981 [JP] Japan ................................. 56/174926

[51] Int. Cl.³ ............................................... G03B 1/00
[52] U.S. Cl. ..................................................... 354/421
[58] Field of Search ...................... 354/31, 32, 33, 34, 354/60 F, 127, 128, 139, 145, 149, 266, 289, 421

[56] References Cited

U.S. PATENT DOCUMENTS

| | | | |
|---|---|---|---|
| 4,258,991 | 3/1981 | Kuraish | 354/32 |
| 4,274,722 | 6/1981 | Numata | 354/33 |
| 4,363,542 | 12/1982 | Kondo et al. | 354/33 X |
| 4,398,127 | 8/1983 | Bahn et al. | 354/127 X |

Primary Examiner—Russell E. Adams
Assistant Examiner—Brian W. Brown
Attorney, Agent, or Firm—Fitzpatrick, Cella, Harper & Scinto

[57] ABSTRACT

In a flashlight emission system, apparatus for lighting a flash tube to illuminate an object and for controlling the quantity of emitted light from the flash tube, the apparatus being cooperative with a camera having structure for presetting ASA speed of film and aperture value of a taking lens prior to taking, there is provided a device for displaying the limit of object distance for providing an optimum exposure to the film comprising; apparatus for receiving information of the ASA speed and aperture value from the camera to make up first data corresponding to the received information; apparatus for making second data indicative of the limit of the quantity of emitted light controllable by the control apparatus; a device for calculating the limit of object distance from the first and second data and generating an output corresponding to the limit found out by the calculation; and apparatus for making a visual display of the limit of object distance in response to the output of the calculation device.

20 Claims, 20 Drawing Figures

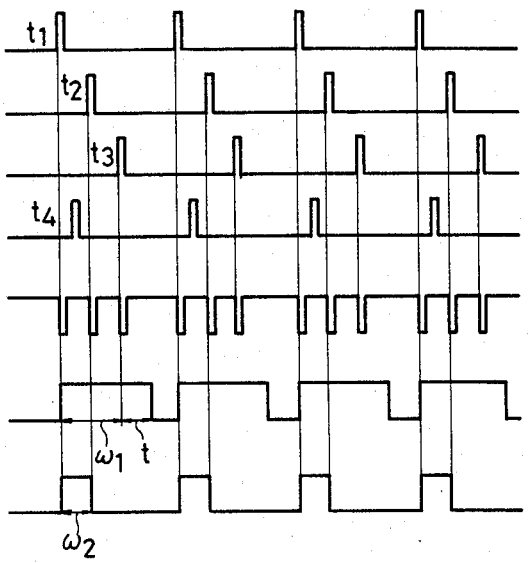
FIG. 8A
FIG. 8B
FIG. 8C
FIG. 8D
FIG. 8E
FIG. 8F
FIG. 8G
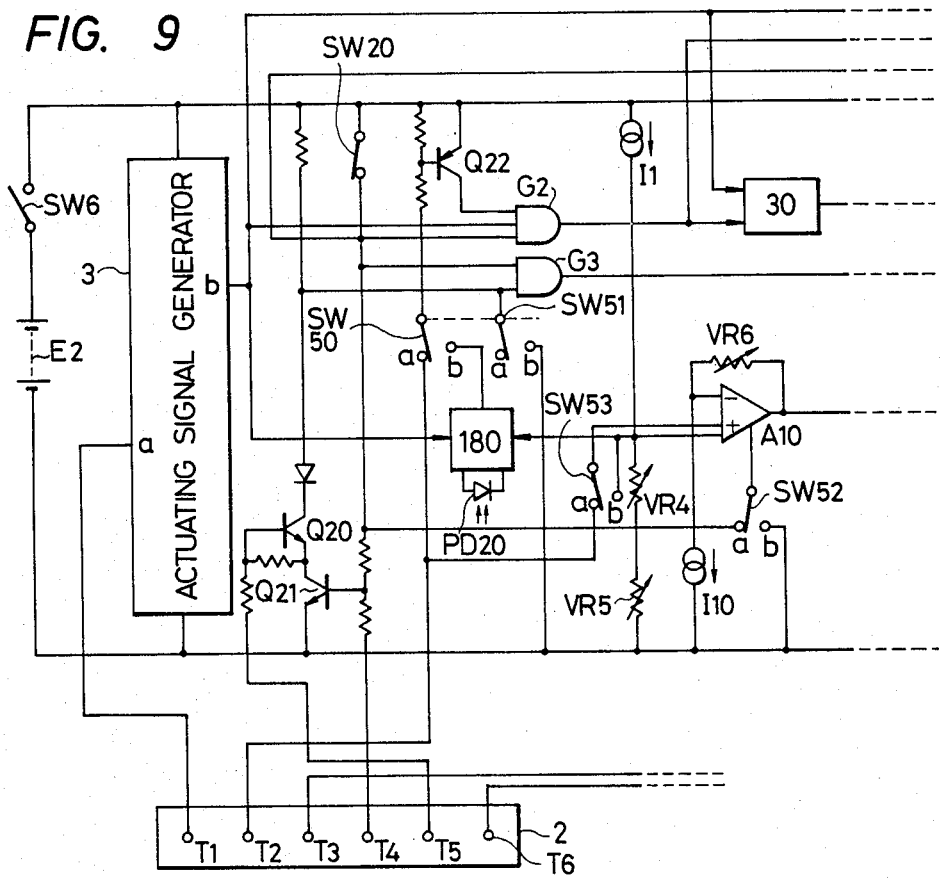
FIG. 9

DISPLAY UNIT FOR FLASHLIGHT PHOTOGRAPHY

BACKGROUND OF THE INVENTION

1. Field of the Invention

The present invention relates to a display unit for flashlight photography and more particularly to such a display unit for providing a visual display of information relating to the object distance at which a proper exposure is obtainable by flashlight photographing operation.

2. Description of Prior Art

In a flashlight emission device cooperating with a camera for flashlight photography, the maximum quantity of emitted light from the flash discharge tube is generally limited by various factors such as the charge voltage of the main condenser and the adjustable range of flashlight illumination by the optical member for directing the emitted light from the discharge tube toward the object field. In an electronic flashlight emission device as disclosed in U.S. Pat. No. 4,210,849, only a certain limited portion of the charged energy on the main condenser is used to emit flashlight. In this type of electronic flashlight emission device, the maximum quantity of emitted light is further limited as compared to other conventional flashlight emission devices in which all of the charged energy on the main condenser are used to emit flashlight. The maximum object distance for flashlight photography is, therefore, determined depending on it whether or not any proper exposure can be obtained with the maximum quantity of emitted light. On the other hand, the minimum object distance for flashlight photography is limited by the following three different factors:

The first factor is the condition of optical illumination.

When the distance from the taking lens to the object is too small, the object is not uniformily illuminated by the flashlight because of the lack of coincidence of the optical axis of the taking lens with the optical axis of the flashlight emission part. The light is highly concentrated near the optical axis of the illumination optical system of the flashlight emission part. Due to these and other known adverse phenomenons, when the object distance exceeds a lower limit, it is no longer possible to take a good picture by flashlight photography. Therefore, the minimum object distance should be selected at a distance up to which there does not occur such adverse phenomenon.

The second factor is the possible minimum quantity of emitted light which is affected by the components of the electric circuit used to control the quantity of emitted light.

As well known to those skilled in the art, to control the quantity of emitted light, there is usually used a commutation circuit including a thyristor and a commutation condenser by which circuit the discharge current from the flash discharge tube is cut off. At the cut-off of the discharge current, an emission stop signal is generated. However, at the time there is produced a commutation current from the commutation condenser and light is emitted by the commutation current at the cut-off of the discharge current. Because of this commutation current, the flashlight emission can not be stopped at once by the stop signal but there always remains always a small amount of afterglow following the generation of a stop signal. The magnitude of this afterglow depends on the charge voltage of the main condenser. Therefore, the percentage of the standing afterglow component to the quantity of the emitted flashlight increases gradually with decreasing of the quantity of emitted light. This means that the quantity of emitted light should not be decreased without limitation in order to maintain the practically desirable level of accuracy of control on the quantity of emitted light. On the other hand, the time from the emission start to the emission stop becomes shorter with a decrease in the quantity of emitted light. In practice, signal transmission between circuits has necessarily a certain definite time lag. The accuracy of control of the quantity of emitted light is affected by this steady time lag of signal transmission. When the emission time is very short, the effect of time lag on the control accuracy becomes much more remarkable. In this sense, the possible minimum quantity of emitted light is limited also by such signal time lag. Therefore, the minimum object distance for flashlight photography is limited also by this limitation imposed on the minimum quantity of emitted light.

The third factor is the change in spectral characteristics of the flashlight.

The spectral characteristics of the flashlight is adversely changed with the decrease of flashlight emission time. This change of spectral characteristics is destructive to the color balance and, therefore, it has an adverse effect on picture-taking using a color film. To obtain a photographically acceptable exposure it is required to impose a limitation to the minimum quantity of emitted light also in this point of view. Consequently, the minimum object distance is limited also by this third factor.

SUMMARY OF THE INVENTION

Accordingly it is the main object of the present invention to provide such apparatus which is able to calculate the object distance allowable for flashlight photography taking into account all of the above described factors by which the object distance for flashlight photography is limited and also able to make a display of the object distance which can provide proper exposure for flashlight photography.

It is another object of the invention to provide a flashlight emission unit which can be used exchangeably in combination with a camera and which makes possible a display of the allowable object distance whether or not the camera is provided with the function of arithmetic operation for controlling the quantity of emitted light from the flashlight emission unit.

According to the invention, the above-mentioned objects are achieved by a device for making a display of the optimum exposure limit of object distance in a flashlight emission apparatus having means for lighting a flash tube to illuminate an object to be taken and means for controlling the quantity of emitted light from the flash tube, the apparatus being cooperative with a camera having means for presetting ASA speed of film and aperture value of the photography lens prior to taking. The device comprises; means for receiving information of the ASA speed and aperture value from the camera to make up first data corresponding to the received information;

means for providing second data indicative of the limit of the quantity of emitted light controllable by the control means; means for calculating the limit of object distance from the first and second data and generating an output corresponding to the limit determined by the calculation; and means for providing a visual display of the limit of object distance in response to the output of the calculation means.

In another context, according to the invention, we contemplate, in a camera cooperative with a flashlight emission apparatus for exposing a photosensitive film to light, the improvement comprising a device for output of information used to control the light emission from the flashlight emission apparatus, the information output device including means for generating first information corresponding to ASA speed value and aperture value set by an ASA film-speed value setting means and aperture setting means contained in the informating generating means, means for measuring the quantity of light transmitted through a taking lens of the camera during the light emission from the flashlight emission apparatus and generating second information when the measured quantity of light reaches a determined value, an electric output terminal for connection with the flashlight emission apparatus, releasing means operable to start the exposure of film, and means for selectively connecting the first and second informating generating means with the output terminal, the connecting means selecting the first information before the releasing means is operated and selecting the second information during the time from the operation of the releasing means at least to the completion of the exposure.

Other and further objects, features and advantages of the invention will appear more fully from the following description taken in connection with the accompanying drawings.

BRIEF DESCRIPTION OF THE DRAWINGS

FIGS. 8A to 8G are timing charts showing the signal transmission in the circuit of the second embodiment showin in FIG. 7;

FIG. 9 is a circuit diagram showing the third embodiment of the invention;

DESCRIPTION OF PREFERRED EMBODIMENTS

In the following description of the preferred embodiment, the exposure factor is expressed in APEX denomination.

Figure 1:
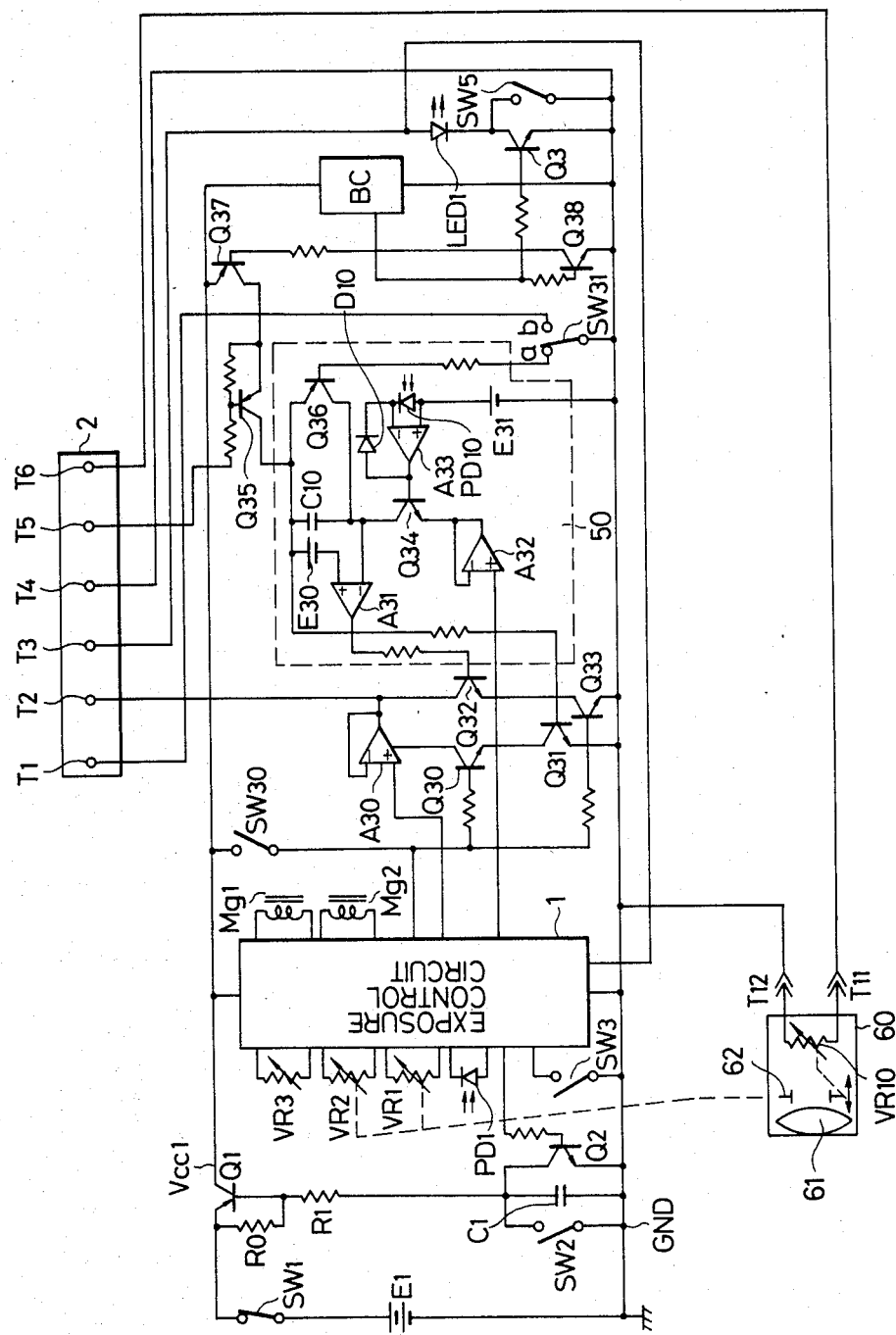
FIG. 1 shows the circuit formed on the camera's side according to the first embodiment of the invention.
Figure 2:
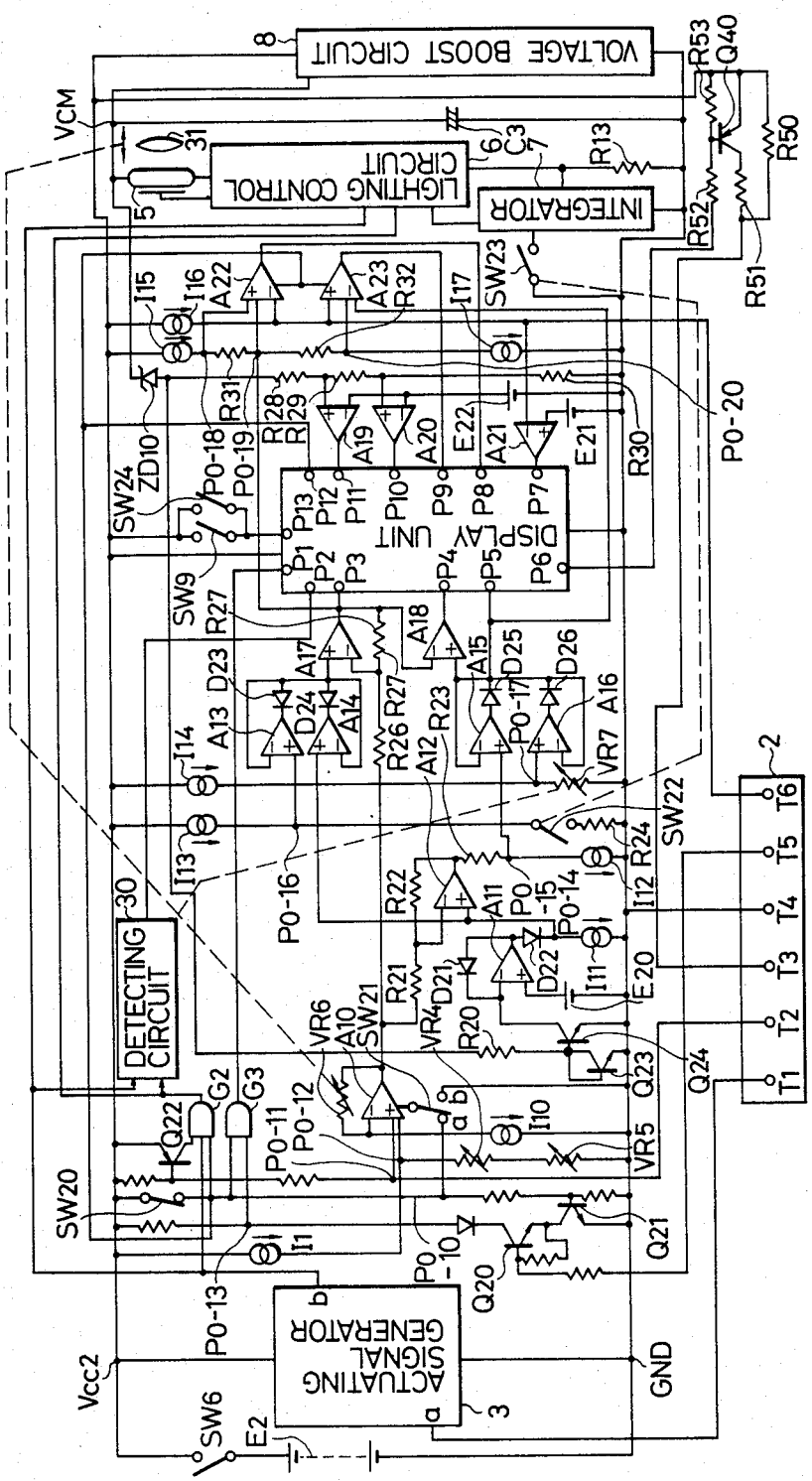
FIG. 2 shows the circuit formed on the electronic flashlight emission unit's side according to the first embodiment.

Referring to FIGS. 1 and 2 showing an embodiment of the invention, the circuit on the camera's side shown in FIG. 1 and the circuit on the flashlight emission unit's side shown in FIG. 2 are electrically connected through connection terminals $T_1$–$T_6$ provided on an accessary shoe 2. In case the electronic flashlight emission unit is removable from the camera, the connection terminals $T_1$–$T_6$ are rendered conductive when the flash unit is mounted on the camera.

In the circuit shown in FIG. 1, SW1 is a power source switch. By closing the switch SW1, electric power is supplied to between power supply line Vcc1–GND from a power source E1. SW2 is a switch which is closed by pushing down a shutter button (not shown) over the first stroke. A condenser C1 is connected in parallel to the switch SW2. Q1 is a power supply control transistor which is conductive during the time of the switch SW2 being closed or during the time from the closing of SW2 after once being opened to the time point at which the condenser C1 is completely charged up to a determined voltage level through resistors R0 and R1.

1 is an exposure control circuit to which various exposure determining factors are introduced from variable resistors VR1–VR3 and a photo diode PD1. The variable resistor VR1 is variable in resistance value according to the maximum aperture value AV0 of the lens. The aperture of the lens can be preset to any desired value AV by means of a known preset diaphragm ring (not shown). The resistance value of the second variable resistor VR2 is variable according to the difference in diaphragm step between the maximum aperture value and the preset aperture value i.e. AV0−AV. The resistance value of the third variable resistor VR3 is variable according the film sensitivity SV. The photo diode PD1 is a photo receptor element for TTL photometering through the open aperture. PD1 produces a photometric output, BV−AV0. From the above exposure factors then introduced, the exposure control circuit 1 carries out an arithmetic operation to find out an optimum shutter time in second, $TV=BV+SV-AV$.

When the shutter button is pushed down to the second stroke, a switch SW3 is closed. In response to the closing of the switch SW3, the exposure control circuit 1 excites an electromagnetic release magnet Mg1 to initiate the mechanical sequence of operation of the camera (including the stop-down of the lens aperture, lifting-up of the mirror, releasing the opening curtain of the shutter etc.). The result of the above arithmetic operation is memorized in the circuit, for example, in link with the movement. Further, the exposure control circuit 1 excites a second magnet Mg2, for example, in response to the closing of the switch SW3 to hold the closing curtain of the shutter in the starting position against running. When an exposure time corresponding to the determined optimum shutter time TV has passed from the running start time point of the aperture opening curtain, the magnet Mg2 is deenergized to allow the closing curtain to start running. Connected parallel to the switch SW2 is a transistor Q2 which is rendered conductive, for example, in response to the closing of SW3 and blocked off in response to the completion of exposure control. Consequently, the transistor Q1 remains conductive during the exposure control so that the operation of the exposure control circuit 1 is assured during that time.

The exposure control circuit 1 applies to a voltage follower A32 a voltage corresponding to the film sensitivity SV. A TTL metering photo diode PD10 is connected between the positive and negative input terminals of an operational amplifier A33. A reference power source E31 is provided to bias the positive input terminal of the operational amplifier A33. D10 is a logarithmic compression diode which forms a negative feedback loop of the operational amplifier A33. Q34 is a logarithmic expansion transistor which converts the output voltage of the amplifier A33 into current. The emitter of the transistor Q34 is biased by the output voltage of operational amplifier A32. An integrating condenser C10 is charged with the collector current of the transistor Q34. The voltage charged on the integrating condencer C10 and the reference voltage E30 are compared each other by a comparator A31. When the two voltages reach a determined relation, the comparator A31 renders the transistor Q32 conductive. SW31 is a synchro-switch having two terminals a and b. Before running of the aperture opening curtain, the terminal a is selected and the switch is switched over to the terminal b at the time point of the full-opened aperture. At the end of running of the aperture closing curtain, the terminal a is again selected. Connected parallel to the integrating condenser C10 is a transistor Q36 which is conductive while the terminal a is selected by SW31 whereby the condenser C10 is short-circuited. During the selection of terminal b by the synchro-switch SW31, the transistor Q36 is nonconductive to allow the integrating condenser C10 to be charged.

The circuit part 50 enclosed by a dotted line in FIG. 1 constitutes a metering circuit for generating a TTL light emission stop signal.

BC is a battery checking circuit which renders transistors Q3, Q37 and Q38 conductive only when the voltage of the power source E1 is at a level suitable for the operation of the circuit on the camera's side. These transistors are non-conductive when the switch SW1 is opened and the transistor Q1 is non-conductive. As will be described later, transistor Q35 is rendered conductive in synchronism with the start of light emission of the electronic flashlight emission unit.

When the transistors Q35 and Q37 are conductive, the metering circuit 50 operates while receiving power from the power source E1. When transistor Q35 is conductive, transistor Q31 is rendered conductive. Connected in parallel to the transistor Q3 which is rendered conductive and non-conductive in opposite phase to ON-OFF of the power source switch SW1. A switch SW30 is closed, for example, interlocking with the mirror-up and opened interlocking with the termination of exposure. The exposure control circuit 1 stores the above-mentioned optimum shutter time TV when the switch SW30 is closed and cancels the stored shutter time when the switch is opened. In synchronism with ON and OFF of the switch SW30, transistors Q30 and Q33 are rendered conductive and nonconductive.

From the exposure determining factors introduced from the variable resistors VR1-VR3, the exposure control circuit 1 carries out an arithmetic operation to determine the flashlight exposure factor, AV-SV which is applied to a voltage follower (operational amplifier) A30. When one or both of transistors Q30 and Q31 are non-conductive, the operational amplifier A30 puts out the input voltage. But, when both of the transistors Q30 and Q31 are conductive, there is no output voltage from the operational amplifier A30, and the output voltage of A30 becomes equal to the voltage of the supply line GND (logic L).

Connection terminal T1 is connected to the terminal b of the synchro-switch SW31 and terminal T2 is connected to the output terminal of the operational amplifier A30. Between terminal T3 and supply line GND there are connected a light emitting diode LED1 and transistor Q3. Connection terminal T4 is connected to the power supply line GND. The base of transistor Q35 is connected to terminal T5.

60 is a picture taking lens which is provided with an image forming optical system 61, a diaphragm 62 and a variable resistor VR10 interlocked with the motion for focusing. The lens 60 and the variable resistors VR1, VR2 have the aforementioned interlocking relations therebetween. Electrical contacts T11, T12 between camera and lens and the above variable resistor VR10 are interposed between the connection terminal T6 and the power supply line GND.

The exposure control circuit 1 is changed over to flashlight photographing mode by the voltage on the anode of the light emitting diode LED D1 when small or large current flows into the diode LED D1 from the terminal T3 as will be described in detail later. In the flashlight photographing mode, the exposure control circuit 1 sets a shutter time synchronizable with the flashlight emission. So long as the power source switch SW1 is Off and switch SW5 is On, the shutter is controlled not by the exposure control circuit 1 but mechanically by a governor (not shown). When SW1 is On and SW5 is Off, the shutter is electrically controlled by the exposure control circuit 1.

The circuit on the electronic flashlight emission unit will be described with reference to FIG. 2.

In FIG. 2, E2 is a power source and SW6 is a power source switch. By closing the switch SW6 power is supplied between supply lines Vcc2-GND from the power source E2. 8 is a voltage boosting circuit which boosts the voltage of power source E2. The boosted voltage is supplied between the high voltage supply lines Vcm-GND. C3 is a main condenser which is charged with the output from the boosting circuit 8. Start and stop of the lighting of flash discharge tube 5 is controlled by a lighting control circuit 6.

3 is an actuating signal generator composed of, for example, a one-shot multivibrator and having an input terminal a and an output terminal b. The input terminal a is connected to the terminal b of synchro-switch SW31 through connection terminal T1. After switching the synchro-switch SW31 to the terminal b, the actuating signal generator 3 puts out a high level actuating signal from the output terminal b for the maximum light emission time of the electronic flashlight emission unit. The maximum emission time is, for example, about 2-3 msec. A mode selection switch SW20 is connected to the power supply line between Vcc2 - GND. When TTL control mode is selected, the mode selection switch SW20 is turned ON and when full light emission mode is selected, the switch is turned OFF. Outputs of ON and OFF of the switch SW20 (high level output, H for ON and low level output, L for OFF) appear on the signal line $P_{0-10}$. The output of operational amplifier A30 shown in FIG. 1 is transmitted to connection point $P_{0-11}$ and further to the base of transistor Q22 through the connection terminal T2. VR4 is a variable resistor for setting aperture value which is manually set corresponding to the aperture value AV preset by the above-mentioned preset diaphragm ring on the lens VR5 is a variable resistor for setting film sensitivity which is manually set according to the sensitivity SV of the film loaded in the camera. I1 is a constant current source for generating current proportional to absolute temperature. The constant current is supplied to the series-connected variable resistor VR4, VR5 circuit. Thereby, a voltage corresponding to the flashlight exposure factor $AV-SV$ is generated at the connection point $P_{0-12}$. Transistor Q21 is rendered conductive by turn-ON of the mode selector SW20. The base of Q20 is connected to the connection terminal T5 so that a bias current is applied to it when the transistor Q21 is conductive and the transistor Q37 in the circuit on the camera's side is rendered conductive. During the time transistor Q20 is conductive, the transistor Q35 in FIG. 1 is also conductive.

AND gate G2 receives the signal generated at the collector of Q22, the actuating signal appearing on the terminal b of the actuating signal generator 3 and the signal generated on the signal line $P_{0-10}$. When these three signals become all high level, the gate G2 produces a high level first emission stop signal. AND gate G3 receives two signals from the signal line $P_{0-10}$ and the connection point $P_{0-13}$. When the switch SW20 is OFF and/or when transistors Q20 and Q21 are conductive, the gate G3 produces a low level output. When the switch SW20 is ON and transistors Q20, Q21 are non-conductive, a high level output is issued from the gate G3. The output of AND gate G3 is referred to as a mode unsuitability signal.

Switches SW22 and SW23 are in an interlocked relation to each other and turned ON and OFF in-phase. When the switch SW23 is closed (switch ON), the discharge current flowing from discharge tube 5 to resistor R13 is integrated by an integrator 7 for monitoring the quantity of emitted light from the discharge tube 5. When the quantity of emitted light reaches a certain determined value, the integrator 7 issues a second emission stop signal. The mode selected by closing both the switches SW22 and SW23 is referred to as limited emission mode.

The lighting control circuit 6 receives the actuating signal and the first and second emission stop signals. In response to the actuating signal, the lighting control circuit 6 causes the discharge tube to 5 start the emission of light. In response to the first and second emission stop signals, it makes the discharge tube stop the emission. The quantity of light emitted from the emission start by the actuating signal to the emission stop by the first emission stop signal provides the optimum exposure. However, the quantity of light emitted up to the emission stop by the second stop signal does not always provide the optimum exposure (the reason for this will be described later). 30 is a detecting circuit for detecting the result of control. The detecting circuit 30 receives the actuating signal from the actuating signal generator 3 and the first emission stop signal from AND gate G2. In case the first emission stop signal is not produced during the generation of the actuating output (which means that the optimum exposure is not obtained even with the maximum quantity of emitted light from the electronic flashlight emission unit), the detecting circuit 30 issues a high level non-control display signal for a certain time period.

Voltages appearing at the connection points $P_{0-11}$ and $P_{0-12}$ are applied to the positive input terminals of operational amplifier A10. A variable resistor VR6 is connected between the output terminal and the negative input terminal of the amplifier A10. Also, a constant current source I10 is connected between the negative input terminal of the amplifier A10 and the power supply line GND. The constant current source I10 absorbs current proportional to absolute temperature. Switch SW21 has two terminals a and b of which a is connected to the signal line $P_{0-10}$ and the terminal b is connected to the power supply line GND. When the terminal a is selected by the switch SW21, the operational amplifier A10 receives the voltage from the connection point $P_{0-11}$ providing that the mode selection switch SW20 is in the closed position (ON) at the time or it receives the voltage from the connection point $P_{0-12}$ providing that the switch SW20 is in the opened position (OFF) at that time. When the terminal b is selected by the switch SW21, the operational amplifier A10 receives the voltage from the connection point $P_{0-12}$ unconditionally.

In the path of light emitted from the discharge tube 5 there is disposed an optical system 31 comprising a Fresnel lens or the like which is able to continuously change the range of illuminated area by the emitted light from the discharge tube 5. A variable resistor VR6 interlocked with the optical system 31 varies in resistance value in accordance with the illumination range by the emitted light. The resistance value of VR6 decreases gradually with narrowing of the illumination range (by making larger the guide number on the electronic flashlight emission unit). Therefore, the output voltage of operational amplifier A10 is the voltage at the connection point $P_{0-11}$, $P_{0-12}$ plus the first correction voltage determined by the variable resistor VR6.

Between the high voltage power supply lines Vcm–GND there are connected Zener diode ZD10 and resistors, R28, R29, R30 in series. The Zener voltage of ZD10 is set to be equal to the lower limit value in the voltage range within which the discharge tube 5 can emit light. It is usually in the order of several tens of volts. Transistors Q23 and Q24 constitute a current mirror circuit. When the voltage charged on the main condenser C3 becomes higher than the Zener voltage, a current determined by the charge voltage and the resistor R20 is put out from the collector of transistor Q24. The collector of Q24 is connected to the negative input terminal of operational amplifier A11. A logarithmic compression diode D21 is connected between the output terminal and the negative input terminal of the operational amplifier A11. The voltage of reference voltage source E20 is applied to the positive input terminal. Between the output terminal of A11 and the power supply line GND there are connected in series a temperature compensating diode D22 and a constant current source I11 which absorbs current proportional to absolute temperature. Applied to the connection point $P_{0-14}$ is a second correction voltage corresponding to the guide number of the electronic flashlight emission unit and depending on the charge voltage of the main condenser C3.

Connected to the above connection point $P_{0-14}$ is the positive input terminal of operational amplifier A12 whose negative input terminal is connected to the output terminal of operational amplifier A10 through resistor R21. Resistor R22 forms a negative feedback loop of the operational amplifier A12. Between the output terminal of the operational amplifier A12 and the power supply line GND there are connected resistor R23 and constant current source I12 in series. The constant current source I12 absorbs current proportional to absolute temperature. At the connection point $P_{0-15}$ appears a first minimum distance limiting voltage corresponding to the possible shortest object distance for flashlight photography as determined by the electrical factor. Between power supply lines Vcc2–GND there are connected a constant current source I13 and a resistor R24 in series through the above-mentioned switch SW22. The constant current source I13 generates current proportional to absolute temperature. At the connection point $P_{0-16}$ appears a third correction voltage corresponding to the quantity of emitted light in the above-mentioned limited emission mode. A constant current source I14 absorbing current proportional to absolute temperature and a variable resistor VR7 are connected in series between the power supply lines. At the connection point $P_{0-17}$ appears a second minimum distance limiting voltage corresponding to the possible shortest object distance for flashlight photography as determined by the optical factor. The variable resistor VR7 is interlocked with the optical system 31 in such a manner that the resistance value decreases with narrowing of the illumination range and increases with broadening of the illumination range.

Operation amplifiers A13, A14 and diodes D23, D24 constitute a minimum voltage selection circuit to which the second correction voltage appearing at the connection point $P_{0-14}$ and the third correction voltage appearing at $P_{0-16}$ can be applied as input thereto. Through the minimum voltage selection circuit any lower one of the second and third correction voltages is introduced into the positive input terminal of operational amplifier A17. More particularly, when the switches SW22 and SW23 are both ON, the second or the third correction voltage is introduced into the operational amplifier A17. When SW22 and SW23 are both OFF, the second correction voltage is introduced into the operational amplifier A17. The first correction voltage issued from the operational amplifier A10 is introduced into the negative input terminal of the operational amplifier A17 through resistor R26. Resistor R27 forms a negative feedback loop of A17. Thus, receiving the first correction voltage from A10 and the second or third correction voltage from the minimum voltage selection circuit, the operational amplifier A17 produces a maximum distance limiting voltage corresponding to the possible longest object distance for flashlight photography. The operational amplifier A17, resistors R26 and R27 constitute together an inversion amplifying circuit. Operational amplifiers A15, A16 and diodes D25 and D26 constitute a maximum voltage selection circuit. The inputs to the circuit are the first limiting voltage appearing at the connection point $P_{0-15}$ and the second limiting voltage appearing at $P_{0-17}$. Through the maximum voltage selection circuit, any higher one of the first and second limiting voltages is introduced into the positive input terminal of operational amplifier A18 acting as a comparator. The maximum distance limiting voltage from A17 and the first or second minimum distance limiting voltage from the maximum voltage selection circuit are compared each other by the comparator A18.

Zener diode ZD10, voltage dividing resistors R28-R30, comparators A19, A20 and reference voltage source E22 constitute together a monitor circuit for monitoring the level of charge voltage on the main condenser C3. When the charge voltage reaches a level higher than the lower limit of the above-mentioned emission enabling voltage range, the comparator A19 has a high level output. When the charge voltage exceeds the emission enabling voltage corresponding to the maximum quantity of light emitted from the electronic flashlight emission device (referred to hereinafter as charge completion), the comparator A20 has a high level output.

Connected between the power supply line Vcc2 and the connection terminal T6 is a constant current source I16 for generating current proportional to absolute temperature. The voltage of connection terminal T6 and the voltage of reference voltage source E21 are applied to a comparator A21. For example, when the constant current source I16 is connected to the variable resistor VR10 in FIG. 1 through the connection terminal T6, there appears at T6 a voltage corresponding to the taking distance. However, if nothing is connected to T6, then the voltage on the terminal T6 increases up to the voltage of the power supply line Vcc2. Therefore, by setting the reference voltage E21 to the upper limit of the voltage variable with the variable resistor VR10, there is obtainable a low level output from the comparator A21 when the voltage of the terminal T6 rises up to the voltage level of the power supply line Vcc2. This low level output of the comparator A21 serves to prevent an improper display.

Constant current source I15 for generating current proportional to absolute temperature, resistors R31, R32 and constant current source I17 for absorbing current proportional to absolute temperature are connected in series between the power supply lines Vcc–GND. Comparator A22 functions to select inputs to be compared. Voltages applied to the comparator A22 are voltage at the connection point $P_{0-18}$ of constant current source I15 and resistor R31, voltage at the connection point $P_{0-19}$ of resistor R31 and the output terminal of operational amplifier A17 and voltage on the connection terminal T6. Comparator A23 also functions to select inputs to be compared. Voltages applied to the comparator A23 are voltage at the connection point $P_{0-20}$ of resistor R32 and constant current source I17, output voltage (the first or second minimum distance limiting voltage) from the maximum voltage selection circuit and voltage of connection terminal T6. When the mode selection switch SW20 is ON, the positive input terminal of the comparator A22 receives the voltage appearing at the connection point $P_{0-19}$ and the negative input terminal of A23 receives the output voltage from the maximum voltage selection circuit. When SW20 is OFF, the positive input terminal of A22 receives the voltage appearing at the connection point $P_{0-18}$ and the negative input terminal of A23 receives the voltage appearing at the connection point $P_{0-20}$. The negative input terminal of A22 and the positive input terminal of A23 are connected to the connection terminal T6. These comparators A22 and A23 are window comparators.

Switch SW9 is closed for bounce illumination mode. A switch SW24 is connected in parallel to the switch SW9. The switch SW24 is closed when the electronic flashlight emission unit and the camera are connected through an extension code to make it possible to optionally select the illumination position of the flashlight emission unit to the object or when the electronic flashlight emission unit is used as the slave light source for increased lamp lighting.

40 is a display part which has terminals P1–P13. The terminal P1 is connected to the output terminal of AND gate G3, the terminal P2 to the output terminal of detecting circuit 30 and the terminal P3 to the output terminal of operational amplifier A17. The terminal P4 is connected to the output terminal of comparator A18 and the terminal P5 is connected to the output terminal of the maximum voltage selection circuit. The terminal P6 is connected to the power supply line Vcc2 through resistors R52 and R53. Output terminals of comparators A21, A22 and A23 are connected to the terminals P7, P8 and P9, respectively. Output terminals of A20 and A19 are connected to the terminals P10 and P11, respectively. The terminal P12 is connected to the signal line $P_{0-10}$ to receive ON-OFF signal of the mode selection switch SW20. The last terminal P13 receives ON-OFF signal of switches SW9 and SW24.

The connection terminal T4 is connected to the power supply line GND. Q40 is a transistor which is rendered conductive by the bias of resistors R52 and R53. A resistor R50 is connected in parallel to the serial circuit of transistor Q40 and resistor R51. When the transistor Q40 is non-conductive, a small current flows into the light emitting diode LED1 in FIG. 1 through resistor R51 and connection terminal T3. The small current is sufficiently weak not to light LED1. When Q40 is conductive, a lighting current flows in to LED1 through resistors R50 and R51 to light it.

Electrical Characteristics of the Circuit (i) TTL control mode:
In this mode, switches SW22 and SW23 are OFF and the mode selection switch SW20 is ON. Terminal a is selected by the switch SW21.

When the camera release button is pushed down to the first stroke, since transistors Q30 and Q33 are not conductive, the operational amplifier A30 produces an output voltage $V_{A30}$ as given by:

$$V_{A30} = \alpha T + (AV - SV)\frac{kT}{q} \ln 2 \qquad (1)$$

wherein,
T is absolute temperature,
k is Boltsmann's constant,
q is elementary charge of electron, and
$\alpha$ is constant.

As the switch SW20 is ON, the operational amplifier A10 receives the voltage appearing at the connection point $P_{0-11}$ i.e. the output voltage $V_{A30}$ of the operational amplifier A30.

Therefore, the output voltage $V_{A10}$ (the first correction voltage) of the operational amplifier A10 is:

$$V_{A10} = \alpha T + \gamma T + (AV - SV)\frac{kT}{q} \ln 2 \qquad (2)$$

wherein $\gamma T$ is the added voltage by I10 and VR6.

Now, it is assumed that the voltage $V_{C3}$ of the main condenser C3 is higher than Zener voltage $V_{ZD10}$ of Zener diode ZD10, that is, $(V_{C3}-V_{ZD10}) \gg V_{BE}$, wherein $V_{BE}$ is the emitter-base voltage of transistor Q23, 24. Also, it is assumed that the reverse saturation current of the diode D21 is equal to that of D22. Under the conditions, let the current of the constant current source I11 be $i_{11}$. Then, the output voltage (the second correction voltage) appearing at the connection point $P_{0-14}$, that is, the positive input voltage $V_{A12in}$ of the operational amplifier A12 and the positive input voltage $V_{A14in}$ of the operational amplifier A14 are:

$$V_{A12in} = V_{A14in} = \epsilon T + \frac{kT}{q} \ln \frac{V_{C3} - V_{ZD10}}{R_{20} \cdot I_S} - \frac{kT}{q} \ln \frac{i_{11}}{I_S} \qquad (3)$$

$$= \epsilon T + \frac{kT}{q} \ln \frac{V_{C3} - V_{ZD10}}{i_{11} \cdot R_{20}}$$

wherein,
$\epsilon T$ is the voltage of reference voltage source E20 proportional to absolute temperature T, and
$I_S$ is the reverse saturation current of diodes D21 and D22 which are equal to each other.

Since the switch SW22 is OFF, the output of the operational amplifier A13 is sufficiently high and therefore the diode D23 is being counter-biased. Consequently, the input voltage $V_{A14in}$ of the operational amplifier A14 is selected as the positive input voltage $V_{A17in}$ of the operational amplifier A17. The output voltage $V_{A17out}$ is:

$$V_{A17out} = \left(1 + \frac{R27}{R26}\right) V_{A17in} - \frac{R27}{R26} V_{A10} \qquad (4)$$

$$= \left(1 + \frac{R27}{R26}\right) V_{A14in} - \frac{R27}{R26} V_{A10}$$

From above (2)–(4) the output voltage of the operational amplifier A17 becomes:

$$V_{A17out} = \frac{R27}{R26} \frac{kT}{q} \ln 2 \left\{ \frac{\left(\frac{R26}{R27} + 1\right)\left(\epsilon - \frac{k}{q} \ln i_{11} R20\right) - (\alpha + \gamma)}{\frac{k}{q} \ln 2} + \frac{\left(\frac{R26}{R27} + 1\right)}{\ln 2} \ln (V_{C3} - V_{ZD10}) + (SV - AV) \right\} \qquad (5)$$

Providing that R26=R27, the equation (5) gives:

$$V_{A17out} = \frac{kT}{q} \ln 2 \left\{ \frac{2\left(\epsilon - \frac{k}{q} \ln i_{11} R20\right) - (\alpha + \gamma)}{\frac{k}{q} \ln 2} + \frac{2}{\ln 2} \ln (V_{C3} - V_{ZD10}) + (SV - AV) \right\} \qquad (6)$$

As will be described later, this output voltage $V_{A17out}$ corresponds to the effective maximum object distance controllable in the TTL control mode. The maximum object distance is, therefore, a value as given by a calculation taking into consideration the first and second correction voltages. As will be understood from the above, the first correction voltage is the output voltage of the operational amplifier A10 which contains information of correction of the maximum quantity of emitted light depending on the adjustment of the illumination range. The second correction voltage is the output voltage at the connection point $P_{0-14}$ which contains information of correction of the maximum quantity of emitted light depending on the charge voltage of the main condenser C3. In other words, the maximum object distance given by the above calculation is a value well corrected according to the adjusted range of illumination by the flashlight as well as the charge voltage of the main condenser. Therefore, the optimum exposure can be obtained by the control of flashlight output (control of the quantity of emitted light) so long as the object is at a distance from the taking lens shorter than the maximum object distance.

(ii) Full emission mode:

In this mode, switches SW22 and SW23 are both OFF and the mode selection switch SW20 is also OFF. Terminal a is selected by the switch SW21.

In this position of the circuit, the operational amplifier A10 receives the output voltage $V_{0-12}$ appearing at the connection point $P_{0-12}$. This output voltage is made equal to the output $V_{A30}$ of the operational amplifier A30 by variable resistors VR4, VR5 and constant current source I1. Therefore, similarly to the above, the respective output voltages can be expressed by equations (2)–(6) given above. However, since the mode selection switch SW20 is OFF in this case, the flash discharge tube 5 emits light completely up to the full quantity (no control of the quantity of emitted light is executed). Therefore, the output voltage $V_{A17}out$ given by the equation (6) corresponds to only one object distance for which any proper exposure may be obtained in this full emission mode.

(iii) TTL control/limited emission combination mode:

For this combination mode, switches SW22 and SW23 are turned to ON and the mode selection switch SW20 is also turned to ON. Terminal a is selected by SW21.

In this position of the circuit, a voltage determined by constant current source I13 and resistor R24 appears at the connection point $P_{0-16}$ and the voltage is applied to the operational amplifier A13 as input voltage $V_{A13}in$ (the third correction voltage) which is:

$$V_{A13}in = \eta_1 T \qquad (7)$$

wherein $\eta_1$ is a constant determined by the resistor R24.

On the other hand, to the operational amplifier A14 is applied an input voltage $V_{A14}in$ given by the above equation (3). Therefore, the output voltage $V_{A17}out$ from the operational amplifier A17 varies depending on which is higher, $V_{A13}in$ or $V_{A14}in$.

Where $V_{A13}in < V_{A-}in$, the minimum voltage selection circuit selects $V_{A13}in$ and therefore from the above (2), (4) and (7) the output voltage $V_{A17}out$ of the operational amplifier A17 becomes:

$$V_{A17}out = \frac{kT}{q} \ln 2 \left( \frac{2\eta_1 - (\alpha - \gamma)}{\frac{kT}{q} \ln 2} + (SV - AV) \right) \qquad (8)$$

Since the input voltage $V_{A13}in$ is information of the maximum quantity of emitted light in accordance with the above-mentioned limited emission, the output voltage $V_{A17}out$ represents the effective maximum object distance at which TTL control is possible in TTL control mode and limited emission mode. The constant $\eta_1$ is selected corresponding to the limited quantity of emitted light.

Where $V_{A13}in > V_{A14}in$, the minimum voltage selector selects $V_{A14}in$ and, therefore, the output voltage $V_{A17}out$ of the operational amplifier A17 becomes the same as that of the above equation (6). This is the operation where the level of charge voltage on the main condenser C3 is above the lower limit of the emission enabling voltage range but under the level satisfying the limited quantity of emitted light. The output voltage $VA_{17}out$ is already corrected by the correction information of the maximum quantity of emitted light depending on the charge voltage of the main condenser C3 (which correction information is contained in the second correction voltage) and also by the correction information of the maximum quantity of emitted light depending on the setting of the illumination range (which correction information is contained in the first correction voltage). Therefore, the output voltage $V_{A17}out$ corresponds well to the effective maximum object distance. In this mode, continuous shooting with flashlight is impossible because the energy stored in the main condenser is completely consumed by one time emission of light.

(iv) Limited emission mode:

In this mode, switches SW22 and SW23 are ON and the mode selection switch SW20 is OFF. Terminal a is selected by the switch SW21.

In this position of the circuit, the operational, amplifier A10 receives the output voltage $P_{0-12}$ ($=V_{A30}$) at the connection point $P_{-12}$. Therefore, the respective outputs are given by the above equations (2)–(8). However, since the mode selection switch SW20 is OFF, TTL control can not be carried out. Where $V_{A13}in < V_{A14}in$, the output voltage $V_{A17}out$ given by (8) represents only one object distance for which an appropriate exposure may be obtained when the limited quantity of flashlight is emitted. Where $V_{A13}in > V_{A14}in$, the output voltage $V_{A17}out$ represents only one object distance for which an appropriate exposure may be obtained, which is determined by the charge voltage of the main condenser and the set range of illumination by the flashlight.

(v) Terminal b being selected by SW21:

In this case, the operational amplifier A10 receives unconditionally the output voltage $V_{0-12}(=V_{A30})$ from the connection point $P_{0-12}$. Therefore, data of allowable object distance as described in (ii) and (iv) is produced from the operational amplifier A17 as the output voltage $V_{A17}out$.

The above description of the electrical characteristics (i) to (v) is made on the assumption that the quantity of emitted light can be changed continuously within the range of from zero to the maximum. However, in practice, the minimum quantity of emitted light controllable can not be zero. It is finite. Because of that, there occurs such a case where a proper exposure can not be obtained for the object at an extremely close distance. The measure to meet this problem according to the invention will be described hereinafter.

The voltage $V_{R23}$ appearing at the connection point $P_{0-15}$ is:

$$V_{R23} = \delta T \qquad (9)$$

wherein, $\delta$ is a constant determined by I11 and R23.

Therefore, the input voltage $V_{A15}in$ to the operational amplifier A15 is:

$$V_{A15}\text{in} = \left(1 + \frac{R22}{R21}\right) V_{A12}\text{in} - \frac{R22}{R21} V_{A10} - V_{R23} \qquad (10)$$

From (2), (3), (9) and (10) the input voltage $V_{A15}\text{in}$ is given by:

$$V_{A15}\text{in} = \frac{R22}{R21} \cdot \frac{kT}{q} \ln 2 \left\{ \frac{\left(\frac{R21}{R22} + 1\right)\left(\epsilon - \frac{k}{q} \ln i_{11} R20\right) - (\alpha + \gamma) - \frac{R21}{R22} \delta}{\frac{k}{q} \ln 2} + \frac{\left(\frac{R21}{R22} + 1\right)}{\ln 2} \ln(V_{C3} - V_{ZD10}) + (SV - AV) \right\} \qquad (11)$$

To obtain the correspondence to the above equation (6) let R21=R22. Then, the equation (11) can be rearranged as follows:

$$V_{A15}\text{in} = \frac{kT}{q} \ln 2 \left\{ \frac{2\left(\epsilon - \frac{k}{q} \ln i_{11} R20\right) - (\alpha + \gamma) - \delta}{\frac{k}{q} \ln 2} + \frac{2}{\ln 2} \ln(V_{C3} - V_{ZD10}) + (SV - AV) \right\} \qquad (12)$$

Comparing (12) with (6) it is seen that the input voltage $V_{A15}\text{in}$ is level-shifted toward a lower voltage side than the output voltage $V_{A17}\text{out}$ of the operational amplifier by such amount as determined by $\delta$. Thus, the input voltage $V_{A15}\text{in}$ represents the possible shortest object distance for flashlight photography as determined by electrical factors. $\delta$ in (12) is the ratio of the fixed minimum light quantity determined by electrical factors to the maximum light quantity obtained when all of the energy stored in the main condenser C3 is used to emit light. The electrical factors by which the minimum light quantity is determined are time delay in operation of the lighting control circuit 6, afterglow of the flash discharge tube during the time from the generation of the first or second emission stop signal to the real stop point of light emission etc. In general, the ratio of the guide number $GN_{MIN}$ of the minimum light quantity to the guide number $GN_{MAX}$ of the maximum light quantity is in the range of from 1/6 to 1/10. This ratio is relatively constant to the change of the charge voltage $V_{C3}$ on the main condenser C3. On the other hand, the maximum quantity of emitted light corresponding to the guide number $GN_{MAX}$ depends on the charge voltage $V_{C3}$ of the main condenser C3.

As previously mentioned, another possible shortest object distance for flashlight photography is determined by optical factors. The input voltage to the operational amplifier A16 corresponds to the shortest object distance. The input voltage $V_{A16}\text{in}$ (which is independent of flashlight exposure factors) is set by the variable resistor VR7 interlocked with the optical system 31 and is represented by:

$V_{A16}\text{in} = \theta T$ wherein $\theta$ is a constant determined by constant current source I14 and variable resistor VR7.

In this manner, different minimum object distances are determined by different factors, electrical factor, photographic factor and optical factor. However, actually there is used the single shortest object distance which is the longest one of these different minimum object distances. To this end, the maximum voltage selection circuit including operational amplifiers A15 and A16 selects the higher one of two different input voltages $V_{A15}\text{in}$ and $V_{A16}\text{in}$, that is, the voltage corresponding to the longer minimum object distance acceptable for flashlight photography.

Relationship Between Object Distance and Voltage

The guide number GN corresponding to the quantity of emitted light from an electronic flashlight emission unit is given by:

$$GN = K \cdot 2^{SV/2} \qquad (13)$$

wherein, K is a constant determined by the charge voltage of the main condenser, the capacity thereof, the emission efficiency of the discharge tube etc.

Also, the constant K is given by:

$$K = \phi \cdot \mu \cdot \sqrt{I(t)} \qquad (14)$$

wherein $\phi$ is a coefficient determined by the range of object illuminated by light through the optical system 31 (light concentrating characteristic), $\mu$ is the conversion constant for the calculation of guide number, and $I(t)$ is the quantity of object illuminating light.

$I(t)$ is proportional to the electric energy discharged from the discharge tube and therefore it is given by:

$$I(t) = \nu \cdot \tfrac{1}{2} \cdot C \cdot (V_1 - V_2)^2 \qquad (15)$$

wherein, $\nu$ is coefficient for conversion of the electric energy of the flash discharge tube into energy of light, C is the electrostatic capacity of the main condenser, $V_1$ is the charge voltage of the main condenser at the start of flashlight emission, and $V_2$ is the residual voltage of the main 'condenser at the end of emission.

From (14) and (15)

$$K = \phi \cdot \mu \cdot \sqrt{\frac{\nu C}{2}} \cdot (V_1 - V_2) \qquad (16)$$

$$= \phi \cdot \rho \cdot (V_1 - V_2) \text{ wherein,}$$

-continued $$\rho = \mu \cdot \sqrt{\frac{vC}{2}}.$$

On the other hand, when the guide number GN is known, the aperture value AV for optimum exposure and the object distance D(m) hold the following relation:

$$GN = 2^{AV/2} \cdot D \qquad (17)$$

From (13) and (16)

$$D = K \cdot 2^{\frac{SV-AV}{2}} \qquad (18)$$

Substituting (16) for K in (18) gives:

$$D = \phi \cdot \rho \cdot (V_1 - V_2) \cdot 2^{\frac{SV-AV}{2}} \qquad (19)$$

Converting the formula (19) into logarithmic formula gives:

$$\ln D = \ln(\phi \cdot \rho) + \ln(V_1 - V_2) + (SV - AV) \frac{\ln 2}{2} \qquad (20)$$

$$= \frac{\ln 2}{2} \left\{ \frac{2\ln\phi\rho}{\ln 2} + \frac{2}{\ln 2} \ln(V_1 - V_2) + (SV - AV) \right\}$$

The above formula (20) is compared with (6). In (6), $$\frac{kT}{q} \ln 2$$

is gradient term of output voltage $V_{A15}$out, $$\frac{2\left(\epsilon - \frac{k}{q} \ln i_{11} R20\right) - (\alpha + \gamma)}{\frac{kT}{q} \ln 2}$$

is constant term (level shift term), $$\frac{2}{\ln 2} \ln(V_{C3} - V_{ZD10})$$

is first variable term and SV−AV is second variable term. Similarly, ln2/2 in (20) is gradient term of logarithmic value lnD of object distance, 2ln$\phi\rho$/ln2 is constant term, $$\frac{2l}{\ln 2} \ln(V_1 - V_2)$$

is first variable term and SV−AV is second variable term. As readily understood from the above, the formulae (6) and (20) are similar to each other. Therefore, it is understood that the output voltage $V_{A15}$out changes in proportion to the logarithm of the object distance if it is so made as to correspond to the gradient term, constant term, first and second variable terms in (6) and (20). Similarly, formulae, (8) and (12) also correspond to the logarithm of the distance. Also, the input voltage $V_{A1\text{-}6\text{in}}$ of the operational amplifier A16 is so made as to directly correspond to the logarithm of the second minimum object distance.

Operation for Flashlight Emission and Emission Stop (i) Operation in TTL control mode:

The operator pushes down the release button of the camera. With the first stroke of downward movement of the release button, transistor Q1 is rendered conductive. At the time, switch SW30 is open and transistors Q30 and Q33 are not conductive. Therefore, the operational amplifier A30 puts out the flashlight exposure factor SV−AV introduced from the exposure control circuit 1. This flashlight exposure factor is transmitted to the connection point $P_{0\text{-}11}$ through the connection terminal T2. Transistor Q22 remains non-conductive at that time. Since the mode selection switch SW20 is ON, transistors Q20, Q21 and Q35 are rendered conductive providing that the voltage of the power source E1 is at the normal level and transistors Q3, Q37, Q38 are all conductive at that time. With the conduction of transistors Q20, Q21, Q35, the output level of AND gate G3 becomes low, which renders transistor Q31 conductive.

At the closing of power source switches SW1 and SW6 after mounting the electronic flashlight emission unit on the camera, a small current flows into the light emitting diode LED1 from the power source E2 through resistor R50 connection terminal T3. Thereby the exposure control circuit 1 is prepared to drive the shutter at a shutter speed synchronizable with flashlight emission. At the completion of charging of the main condenser C3, transistor Q40 is rendered conductive to light LED1 on.

When the release button is further pushed down to the second stroke, the mechanical operation sequence of the camera is started. At first, switch SW30 is closed which in turn renders transistors Q30 and Q33 conductive. Therefore, the operational amplifier A30 stops to generate the flashlight exposure factor. Next the shutter is fully opened and the synchro-switch SW31 is switched over from terminal a to b. Thereby the actuating signal generator 3 to which a low level signal is applied through T1, generates an actuating signal at its output terminal b. In response to the actuating signal, the lighting control circuit 6 drives the discharge tube 5 to emit flashlight. At the same time, transistor Q36 is rendered non-conductive. Consequently, the integrating condenser C10 is charged according to the quantity of reflected light from the object. When the charge voltage on the integrating condenser C10 becomes lower than the voltage of the reference voltage source E30, the comparator A31 has high level output by which transistor Q32 is rendered conductive. With the conduction of Q32, the base of transistor Q22 is connected to the power supply line GND through terminal T2 and transistors Q32, Q33 whereby transistor Q22 is rendered conductive. As a result, AND gate G2 produces a high level first emission stop signal which is applied to the lighting control circuit 6. Thereby the light emission of the discharge tube 5 is stopped. At the completion of taking a picture, transistor Q36 is rendered conductive to short-circuit the integrating condenser C10.

(ii) Operation in full emission mode:

The operator pushes down the release button. In this mode, switch SW20 is OFF and therefore transistors Q20, Q21, Q35 are not conductive. At the first stroke of downward movement of the release button, the flashlight exposure factor is transmitted to the connection point $P_{0-11}$ from the operational amplifier A30 through connection terminal T2. At the time, transistor Q22 remains non-conductive.

At the second stroke of downward movement of the release button, the switch SW30 is closed to stop the generation of the flashlight exposure factor from the operational amplifier A30 in a manner similar to the above. When the synchro-switch SW31 is switched over to terminal b, the actuating signal generator 3 generates an actuating signal. Therefore, the discharge tube 5 starts to emit light. On the other hand, since transistor Q35 is nonconductive, TTL metering circuit does not operate and transistors Q32, Q22 remain blocked off. The first emission stop signal is not issued from AND gate G2. Therefore, the discharge tube 5 continues the emission of light up to the end of full quantity corresponding to the rated guide number.

(iii) Operation in TTL control-limited emission combination mode:

The mode selection SW20 is closed. Switches SW22 and SW23 are also closed. With the operator's pushing-down of the release button over the first stroke and further over the second stroke, the same operation as in TTL control mode is performed. The manner of operation is entirely the same as described above. However, in this combination mode, the following operation is additionally carried out:

With the start of light emission of the discharge tube 5, the discharge current is integrated by the integrator 7. When a certain limited quantity of light has been emitted from the discharge tube 5, it is detected by the integrator and a second emission stop signal is applied to the lighting control circuit 6 in addition to the abovementioned first emission stop signal. However, the lighting control circuit 6 responds only to the earlier generated one of the first and second stop signals. In response to the earlier generated stop signal, the lighting control circuit 6 terminates the light emission from the discharge tube 5. If the emission is stopped by the first emission stop signal, then an optimum exposure is obtained. However, if the emission is stopped by the second stop signal, optimum exposure is not always assured. The reason for this is that the second emission stop signal is generated depending not on the illuminance of the object but on the limited quantity of emitted light which has been determined for mere expediency.

(iv) Operation in limited emission mode:

Switches SW22 and SW23 are closed. The mode selection switch SW20 is open (OFF). Therefore, in this mode, there is no generation of the first emission stop signal from AND gate G2. Light is emitted in the limited quantity and the emission is stopped solely by the second emission stop signal. In other respects, the operation in this mode is entirely the same as that in the above combination mode.

The operation in the combination mode or in the limited emission mode is particularly convenient for continuous flashlight photographing with a motor drive unit mounted on the camera. By selecting such object the object distance of which is constant (at relatively short distance), it is possible to obtain proper exposure even in the limited quantity of emitted light. In the completely charged main condenser C3 there is stored a sufficient amount of energy to emit light several times for such object and to enable a continuous flashlight photographing of such object.

Details of the display part 40 will be described hereinafter with reference to FIGS. 3 and 4.

Figure 3:
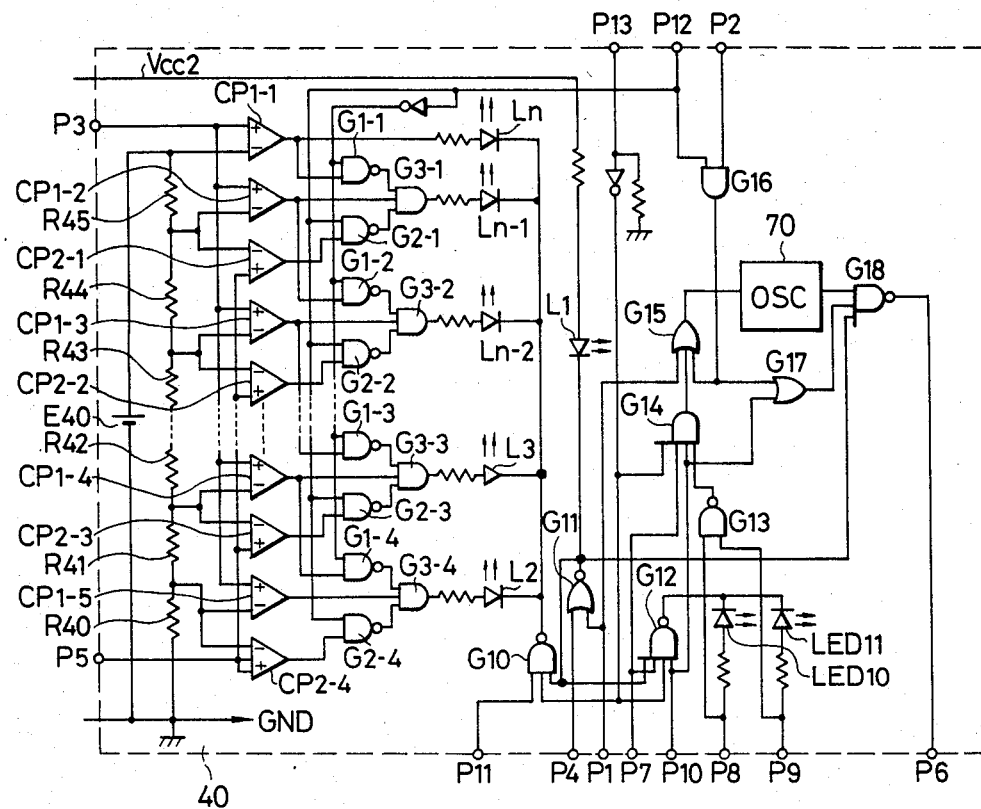
FIG. 3 is a circuit diagram showing an embodiment of the display part of the apparatus according to the invention.

In FIG. 3, E40 is a reference voltage source for generating voltage proportional to absolute temperature. Voltage dividing resistors R41–R45 divide the reference voltage into reference voltages having equal voltage difference each other. First group of comparators CP1-1–CP1-5 receives, as comparison input, the output voltage of operational amplifier A17 (maximum object distance or single object distance) through terminal P3. Second group of comparators CP2-1–CP2-4 receives, as comparison input, the output voltage of the maximum voltage selection circuit (first or second minimum object distance) through terminal P5. When the mode selection switch SW20 is ON and the signal level of terminal P12 is H (high level) i.e. when TTL control mode or TTL control-limited emission combination mode is selected, first NAND gate group G1-1–G1-4 has high level output. Therefore, AND gate group G3-1–G3-4 produces a logic output determined by the logic output of the first comparator group and the logic output of the second NAND gate group G2-1–G2-4. More concretely, the respective comparators CP1-1–CP1-5 of the first comparator group have high level output when the output voltage from the operational amplifier A17 and corresponding to the maximum object distance is higher than the corresponding reference voltage. The respective comparators CP2-1–CP2-4 of the second comparator group have high level output when the input voltage of terminal P5 corresponding to the first or second miminum object distance is higher than the corresponding reference voltage. The second NAND gate group G2-1–G2-4 has high level output when the output of the second comparator group is low level and has low level output when the output of the second comparator group is high. Therefore, when the switch SW20 is ON, AND gate group G3-1–G3-4 produces high level output from such gate or gates which correspond to an object distance between maximum object distance and minimum object distance. When the mode selection switch SW20 is OFF, the second NAND gate group G2-1–G2-4 produces high level output and the terminal P3 receives the output voltage of operational amplifier A17 corresponding to the object distance in full emission mode or limited emission mode. At this time, those comparators whose input reference voltages are higher than the output voltage of the operational amplifier A17 produce low level outputs whereas those comparators whose input reference voltages are lower than the output voltage of A17 produce high level outputs. For instance, comparators CP1-1 and CP1-2 produce low level outputs and comparators CP1-3–CP1-5 produce high level outputs. In this case, G1-1 and G1-2 in the first NAND gate group G1-1–G1-4 will produce high level outputs and, since the comparator CP1-3 is producing high level signal, AND gate G3-2 only will produce high level signal. In this manner, when the mode selection switch SW20 is OFF, a high level output is issued from such AND gate which corresponds to the only object distance which can provide optimum exposure. Light emitting diodes L2–Ln-1 light on in response to the high level output from the corresponding AND gate. 70 is a pulse oscillator which generates high level output when the output of OR gate G15 is low level. When the latter is high level, the pulse oscillator 70 generates high level output and low level output alternately.

Operation of Display (i) Display in TTL control mode or TTL control-limited emission combination mode:

The mode selection switch SW20 is switched ON by which high level signal (H) is applied to one input terminal of AND gate G3. But, since transistors Q35, Q37, Q38 and transistors Q20 and Q21 are conductive at this time, AND gate G3 applies low level signal (L) to the terminal P1 of the display part. Input to the operational amplifier A10 is the voltage of the connection point $P_{0-11}$. Before the emission of light, the terminal P2 is receiving signal L from the detecting circuit 30. Since the mode selection switch SW20 is ON, the comparator A22 is receiving, as an input, the voltage of the connection point $P_{0-19}$ (output from the minimum voltage selection circuit) and the comparator A23 is receiving, as an input, the output of the maximum voltage selection circuit. In TTL control mode, the level of the terminal P12 is rendered high by switch-ON of the mode selection switch SW20. The level of the switches SW9 and SW24 is rendered low.

On the above presumption, the following operations are carried out according to various conditions:

When the charge voltage on the main condenser C3 has risen up above the emission enabling lower limit, the output of comparator A19 appearing at the terminal P11 is turned to high level. However, the output of comparator A20 appearing at the terminal P10 remains low. Let Dmax denote the maximum object distance and Dmin the minimum object distance. Let D denote the distance set at the taking lens. When the set distance D satisfies the condition: $Dmax > D > Dmin$, the output of comprator A18 appearing at the terminal P4 changes to low level. On the other hand, as the mode selection switch SW20 is ON, comparator A22 is receiving, as an input, the voltage appearing at $P_{0-19}$ which corresponds to the possible longest object distance determined by the first and second correction voltages (if necessary, further by the third correction voltage). Comparator A23 is receiving, as an input, the output voltage of the maximum voltage selector which corresponds to the possible shortest object distance determined by the first or second limiting voltage. These two comparators A22 and A23 have a common input voltage which is the terminal voltage of the variable resistor VR10. Therefore, under the above condition, the output of the comparator A23 appearing at P9 becomes high level. The terminal voltage of VR10 i.e. the negative input voltage of comparator A21 is variable within a lower voltage range than the reference voltage E21. Therefore, the output of the comparator A21 appearing at P7 becomes high level.

Consequently gates G11, G12 and G18 produce H whereas gates G10, G13-G17 produce L. As NAND gate G10 generates low output L, of light emitting diodes L2-Ln such one or ones are lighted up which correspond to object distances between Dmax and Dmin. Thus, there is displayed such object distance for which any appropriate exposure can be obtained by TTL control. On the other hand, as the output of NAND gate G12 is high at the time, light emitting diodes LED9 and LED10 do not light up yet. Transistor Q40 is blocked off by the high level output of NAND gate G18 at the time. As previously mentioned, after closing the power switch SW6, a small current is applied to the light emitting diode LED1 on the camera's side through terminal T3 to set the shutter time of the camera to the synchronous time.

Subsequent to the above and at the completion of charging the main condenser C3, the signal level at terminal P10 turns to high level by which the light emitting diodes LED10 and LED11 are lighted to indicate that the set distance D at the taking lens 60 satisfies the above condition. Since the charging of the main condenser C3 has been completed, the maximum object distance Dmax is extended and the number of the light emitting diodes L2-Ln now being lighted is increased corresponding to the extension of Dmax by the action of the second correction voltage.

When AND gate G18 generates low output by which the transistor Q40 is rendered conductive, the light emitting diode LED1 on the camera lights up to indicate the completion of charging the main condenser C3.

If the lens 60 is not provided with the variable resistor VR10, the connection terminal T6 remains open and therefore the signal level at P7 is low. Consequently, NAND gate G12 and AND gate G14 generate always low level output independently of other inputs to the gates. In this case, therefore, the light emitting diodes LED10 and LED11 never light up. The setting of object distance at the taking lens may be done within the distance range displayed by the light emitting diodes L2-Ln at that time.

In case that $Dmax < D$ or $D < Dmin$, one of the outputs from the comparators A22 and A23 (inputs to P8 and P9 respectively) becomes high and the other becomes low. In this case, before the main condenser C3 has been completely charged, NAND gate G10 has low output and NAND gate G12 has high output. Display of object distance is made only by light emitting diodes L2-Ln at the time.

On the completion of charging the main condenser C3, the output of NAND gate G12 changes to low level by which one of LED10 and LED11 is lighted. On the other hand, as NAND gate G13 is generating high level output, when the level of the terminal P10 is turned to high level as the result of the completion of charging C3, OR gate G15 generates high level output. Thereby the pulse oscillator 70 is brought into operation. NAND gate G18 begins to generate high level output (H) and low level output (L) alternately. Therefore, the light emitting diode LED1 on the camera begins flickering to indicate the completion of charging the main condenser C3 as well as the unsuitability of the set distance of the lens. Observing it, the operator (photographer) resets the distance by use of the focusing ring of the lens 60 so as to light both of LED10 and LED11. When both of the light emitting diodes LED10 and LED11 are lighted, the outputs of gates G13-G15 charge to low level whereby the light emitting diode LED1 on the camera lights to indicate that flashlight photography is possible.

If the combination of aperture value and film sensitivity is unsuitable or the main condenser C3 is undercharged or the setting of the optical system 31 is wrong, there occurs the case of $Dmax < Dmin$. In this case, the level of terminal P4 becomes high by which the output of NOR gate G11 is rendered low and the outputs of NAND gates G10, G12, G18 are rendered high. Thereby the light emitting diode L1 is lighted while all other light emitting diodes L2-Ln, LED10, LED11 and LED1 are unlighted This state of display continues until all the causes for $Dmax < Dmin$ as mentioned above are removed completely.

In accordance with the information given by the above various display operations, the operator can set a proper taking distance or remove the cause for existing fault. After the apparatus have correctly been prepared for taking with flashlight in this manner, the operator releases the camera shutter. The quantity of emitted light is automatically controlled by TTL photometering as described above.

When the synchro-contact SW31 is switched over to terminal b, transistor Q20 is rendered non-conductive by which the output of AND gate G3 appearing at terminal P1 is changed to high level. Therefore, NOR gate G11 generates low output and NAND gate G10 generates high output and extinguishes the light of light emitting diodes L2–Ln. Also, NAND gate G18 continues to generate high level output during the time the output of NOR gate G11 is low. Therefore, the light of LED1 on the camera is put out during the time. With the drop of charge voltage on the main condenser by the emission of flashlight, the voltage level at terminal P10 changes to low level. Therefore, the light of LED10 and LED11 also is extinguished. On the other hand, OR gate G15 generates high level output to drive the pulse oscillator 70. But, NAND gate G18 continues to generate high level output during the time the output of G11 is low.

As previously described, when the quantity of emitted light has reached a determined level, AND gate G2 issues a first emission stop signal to terminate the emission of light from the discharge tube 5. In this case, the output of the detecting circuit 30 remains low. Therefore, when the synchro-switch SW31 is switched over to the terminal a after the completion of the flashlight photographing, the above display operation is repeated. On the contrary, if the quantity of emitted light could not reach the determined level, the detecting circuit 30 generates high level output for a certain time length. Thereby AND gate G16 generates high level output. Consequently, when the synchro-switch SW31 is switched over to terminal a and the output of NOR gate G11 is turned to high level after the completion of the flashlight photographing, NAND gate G18 begins to generate high level output and low level output alternately to flicker the light emitting diode LED1 on the camera. This flicker of LED1 is a sign indicating the failure of light emission control.

If the flashlight exposure factor (SV−AV) can not be transmitted to the flashlight emission unit by any trouble after the connection of the camera shown in FIG. 1 and the electronic flashlight emission unit in FIG. 2, the operator switches over the switch SW21 to terminal b. By doing so, it is made possible to introduce the flashlight exposure factor appearing at the connection point $P_{0-12}$ into the operational amplifier A10. Also, in this case, the above operation of display is performed when the aperture value and the film sensitivity are manually set on camera's side by means of variable resistors VR4 and VR5.

(ii) Display in full emission mode or limited emission mode:

Since the mode selection switch SW20 is OFF, both of terminals P1 and P12 are in the state of low level. Operational amplifier A10 receives, as an input, the voltage appearing at the connection point $P_{0-12}$. Comparators A22 and A23 receive voltages appearing at $P_{0-18}$ and $P_{0-20}$ respectively. A low level signal is constantly applied to terminal P2 from the detecting circuit 30. Switches SW9 and SW24 are open (OFF) and the level of terminal P13 is low. In this position of the circuit wherein the terminal P12 is at low level, only one of light emitting diodes L2–Ln is lighted. The light emitting diode to be lighted is that which corresponds to the only object distance Da for which an optimum exposure can be obtained. As previously mentioned, the voltage corresponding to the only object distance Da is the input voltage of terminal P3.

In case that Da>Dmin, NOR gate G11 generates high level output because of the level of P4 being low. Therefore, the light emitting diode L1 can not light up.

When the main condenser is charged up to the voltage level above the lower limit of the emission enabling voltage range, the level of terminal P11 changes to high level. But, the level of terminal P10 remains low. At this time point, NAND gate G10 generates low level output. Thereby, any one of the light emitting diodes L2–Ln lights. Of course, the input voltage of P3 contains the information of the first and second correction voltages (if necessary, also the third correction voltage). However, since the output of NAND gate G12 is still low level, the light emitting diodes LED10 and LED11 do not light at the time. However, if it is necessary, a picture taking with flashlight may be carried out at this stage of operation providing that the distance D set at the lens should be brought into coincidence with the optimum object distance Da now being displayed.

On the completion of charging the main condenser, NAND gate G12 generates low level output. On the other hand, the comparators A22 and A23 receive the terminal voltage of VR10 as one common input and the voltages at $P_{0-18}$ and $P_{0-20}$ as the other input respectively. The voltages at these connection points $P_{0-18}$ and $P_{0-20}$ provide a determined width of dead zone between A22 and A23 the middle point of which dead zone (insensible zone) is at the voltage corresponding to the optimum object distance.

Where the set distance of the lens i.e. the terminal voltage of the variable resistor VR10 lies within the dead zone, the terminals P8 and P9 are both at high level so that LED10 and LED11 are lighted. At the time, NAND gate G13 generates low output and therefore NAND gate G18 generates low output to light LED1 of the camera.

On the contrary, where the set distance of the lens lies out of the dead zone, one of the two light emitting diodes LED10 and LED11 lights up along according to the set distance at the lens which is too long or too short to be optimum. At the time, NAND gate G13, AND gate G14 and OR gate G15 generate high level outputs. Thereby, the pulse oscillator 70 is driven. NAND gate G18 begins to generate high level output and low level output alternately to flicker LED1 on the camera. This flickering LED1 indicates that the set distance at the lens is not coincident with the optimum object distance.

If the lens 60 is not provided with variable resistor VR10, the level of terminal P7 becomes low level. Therefore, LED10 and LED11 are extinguished. In this case, the set distance at the lens has to be brought into coincidence with the optimum object distance now being displayed by L2–Ln. On the completion of charging the main condenser, LED1 lights.

In case that Da<Dmin, light emitting diodes L2–Ln, LED10, LED11 and LED1 are all off. Instead, the light emitting diode L1 lights.

(iii) Display in bounce illumination or extension emission mode:

When SW9 and SW24 are switched over from OFF to ON, NAND gates G10 and G12 generate high level outputs. Therefore, no display is produced by light emitting diodes L2-Ln, LED10 and LED11. However, the light emitting diode L1 lights to give a warning of the wrong state of Dmax<Dmin or Da<Dmin only when low output is generated from NOR gate G11 at the completion of charging the main condenser C3 due to the existing wrong state. When the output of G11 is high, NAND gate G18 generates low output at the completion of charging the main condenser to light LED1 of the camera.

(iv) Display in the case where camera and flashlight emission unit are mismatched in operational relationship:

A typical example of mismatching occurs where an electronic flashlight emission unit as shown in FIG. 2 is mounted on a camera without TTL control function and the mode selection switch SW20 is switched ON. In this case, the level of terminal P1 becomes high. NOR gate G11 generates low output. NAND gates G10, G12 and G18 generate high level outputs. Consequently, all of emitting diodes L2-Ln, LED10, LED11 and LED1 are extinguished. This operation takes place also in such a case where SW1 is switched OFF and SW5 is switched ON during the time transistor Q1 is blocked off or after connecting the electronic flashlight emission unit shown in FIG. 2 to the camera shown in FIG. 1.

Figure 4:
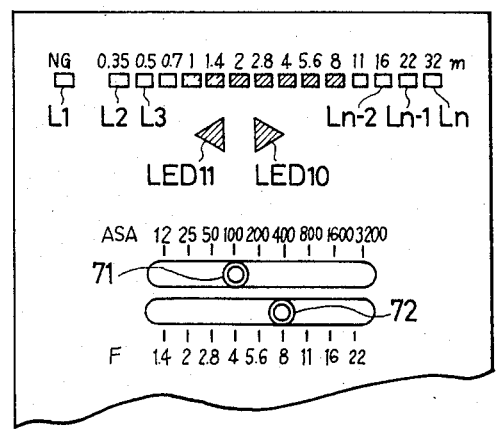
FIG. 4 is an external view of the display part.

FIG. 4 is an external view of the display part of the electronic flashlight emission unit.

As shown in FIG. 4, a symbol NG (none good) is marked to the light emitting diode L1. Object distance graduation marks are provided to the light emitting diodes L2-Ln. Light emitting diodes LED10 and LED11 are so shaped as to indicate a certain direction. The directions indicated by the diodes correspond to the directions in which the focusing ring of the lens 60 is rotated. 71 is a film sensitivity setting button interlocked with the variable resistor VR5. 72 is an aperture value setting button interlocked with the variable resistor VR4.

Figure 5:
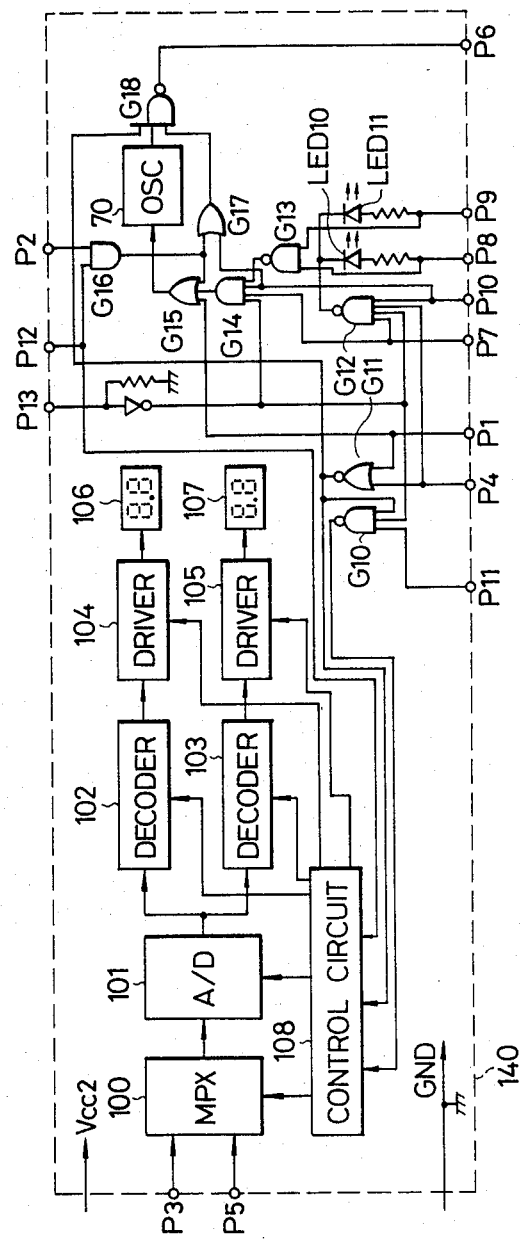
FIG. 5 is a circuit diagram showing another embodiment of the display part.

FIG. 5 shows another embodiment of the display part in circuit diagram. Like reference characters to FIG. 3 represent the same or corresponding elements the function and operation of which are entirely the same as described above.

In FIG. 5, an analog multiplexer 100 periodically selects the analog input voltages of terminals P3 and P5 by a control circuit 108 and transmits the selected voltage to A/D converter 101. The output of A/D converter 101 is decoders 102 and 103 which carry out data latch and segment decoding for display. The decoders 102 and 103 are controlled by the control circuit 108 in such manner that they latch the input data in synchronism with the operation of the multiplexer 100. Thus, the decoder 102 repeats data storing and data refreshing at a determined cyclic period regarding only the digitalized data from the terminal P3. The decoder 103 repeats data storing the data refreshing at a determined cyclic period regarding only the digitalized data from the terminal P5. Display drivers 104 and 105 drive digital display devices 106 and 107 according to the docoded contents of the decoders 102 and 103 respectively. Each of the display devices 106 and 107 may be LED segment display device or segment display device composed of LCD (liquid crystal device) or EC (electrochromic device). In case of the display device composed of LCD, EC or the like, the display device is provided with illumination means for making the display visible in the dark.

The manner of operation for display is as follows:

In the case where the terminal P12 is at high level i.e. in the case of TTL control mode, the control circuit 108 controls the drivers 104 and 105 in such manner as to effect display by both display devices 106 and 107.

Figure 6:
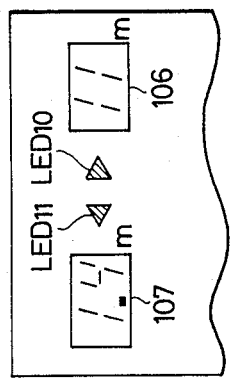
FIG. 6 is an external view thereof.

As previously mentioned, when there is any mismatching or other similar wrong operational state, NOR gate G11 generates low level output. At the time, NG or equivalent character display pattern is displayed by the segment display devices 106 and 107. When the output of NAND gate G10 becomes high, the maximum object distance or the optimum object distance based on the input of terminal P3 is displayed by the display device 106 and the minimum object distance based on the input of terminal P3 is displayed by the display device 107. Other parts of operation correspond to those of FIG. 3 embodiment and therefore need not be further described. FIG. 6 is an external view of the display part in FIG. 5 showing an example of display made by it.

Figure 7:
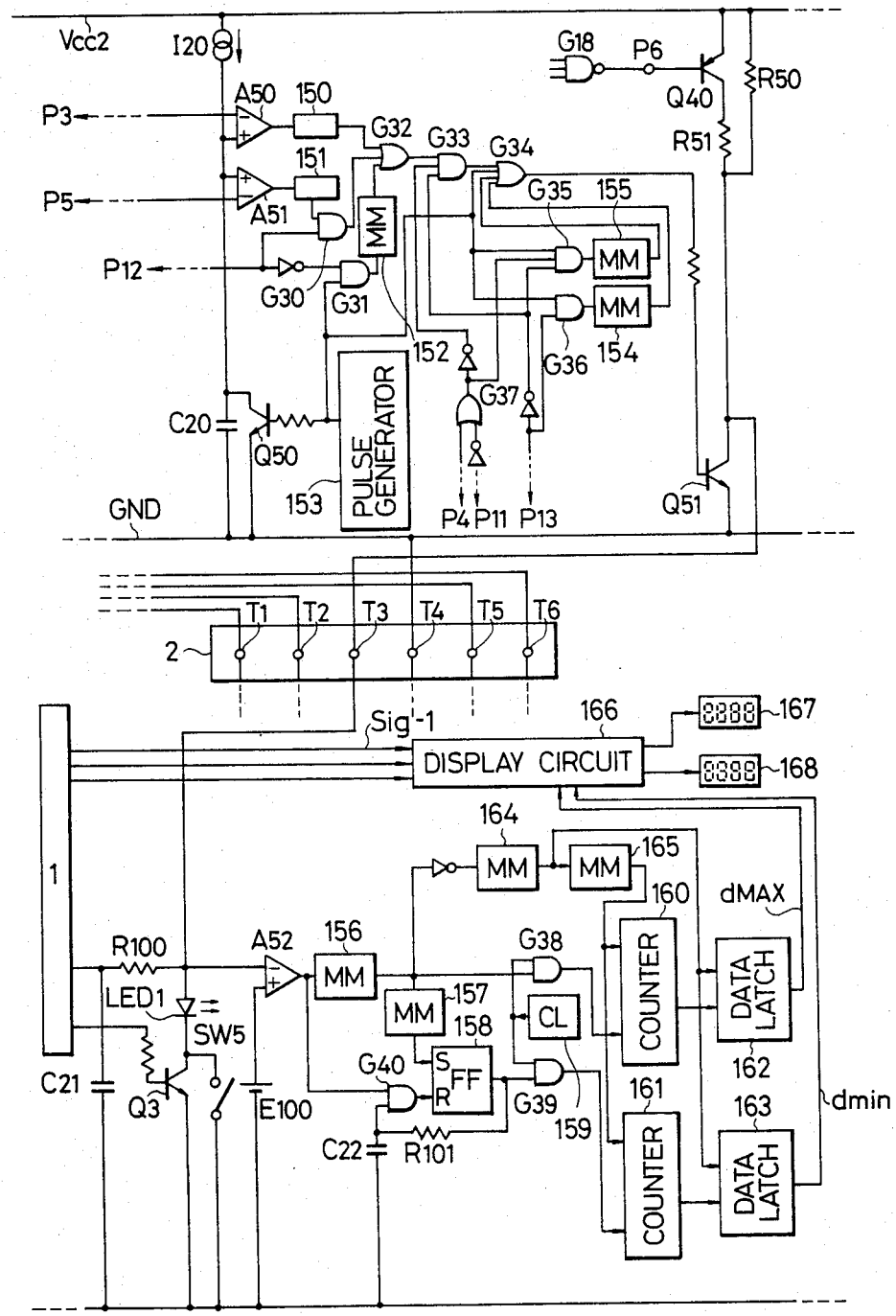
FIG. 7 is a circuit diagram showing the second embodiment of the invention.

FIG. 7 shows another embodiment of the invention wherein display of distance can be made not only on the flashlight emission unit but also on the camera. FIG. 7 shows only the part relating to display control on the camera's side. As for the flashlight emission device, only the part newly added to the circuit previously shown in FIG. 3 is shown in FIG. 7. Similarly, as for the camera, the part newly added to the circuit previously shown in FIG. 1 is mainly shown in FIG. 7. Like reference characters to FIGS. 1 to 3 represent the same or functionally corresponding elements.

Referring now to FIG. 7, a pulse generator 153 generates pulses (t1) with a constant period (in the range of from several 10 ms to several 100 ms) as shown in FIG. 8A. The pulse (t1) is transmitted to a transistor Q50 which is momentarily rendered conductive by the pulse to discharge a condenser C20. With this periodic discharging operation of transistor Q50 there is formed a saw-tooth wave by a constant current source I20 and the condenser C20. The saw-tooth wave is applied to the positive input terminals of comparators A50 and A51. The current of the constant current source I20 is proportional to absolute temperature. The reason for this is that since, as previously mentioned, the voltage of terminal P3, P5 is proportional to absolute temperature, it is required to convert it into time pulse independent of temperature. 150 and 151 are differentiation and shaping circuits which generate pulses (t2, t3 in FIGS. 8B and 8C) when the outputs of comparators A50 and A51 change from low level to high level. The period of the pulses t2 and t3 is equal to that of t1. However, t2 and t3 are different in phase relative to t1. The time interval between pulses t1 and t2 corresponds to the minimum object distance transmitted to terminal P5. The time interval between t1 and t3 corresponds to the maximum object distance or optimum object distance transmitted to terminal P3. When full emission mode is selected at the electronic flashlight emission unit, the level of terminal P12 becomes low by which AND gate G30 is closed and AND gate G31 is opened. Therefore, in synchronism with the pulse t1 and after a certain time delay, a pulse t4 as shown in FIG. 8D is generated from a one-shot multivibrator 152, and the pulse t2 is replaced by pulse t4. The time interval between t1 and t4 is so selected as to be shorter than the time interval between t1 and t2. As will be described later, during the generation of pulse t4 from the one-shot multivibrator 152, the display of short distance on the camera's side is replaced by a suitable character or pictorial symbol such as "MANUAL". When terminal P4 is low level, P11 is high and P13 is low, transistor Q51 is rendered conductive and non-conductive by pulses t1, t2, t3 through gates G33 and G34 thereby producing a signal as shown in FIG. 8E. The signal is transmitted to the circuit on the camera through connection terminal T3. When P4 is high level, P11 is low and P13 is low level, gate G33 is closed and gate G35 is opened so that a pulse with a certain time delay from t1 is generated from one-shot multivibrator 155. At that time, the pulse t1 and the pulse generated from 155 are together put out from gate G34 and transmitted to the camera while controlling transistor Q51.

When P13 is high level, gates G33 and G35 are closed and gate G36 is opened so that a pulse with a certain delay from t1 is generated from one-shot multivibrator 154. The pulse t1 and the pulse generated from 154 are together put out from gate G34 and transmitted to the camera while controlling the transistor Q51. One-shot multivibrators 152, 154 and 155 mentioned above have different delay times from each other, which delay times are all shorter than the shortest pulse time of t2.

Similarly to the above embodiment, through resistor R100 a signal is transmitted to the control circuit 1 of the camera to change over the camera to flashlight photography mode when the current becomes larger than the small current flowing into it through resistor R50. In this embodiment, there is provided a low-pass filter composed of condenser C21 and resistor R100 to prevent any malfunction caused by pulse signals from the transistor Q51.

When transistor Q40 is conductive, the light of LED1 is put out for a moment by the pulse from the transistor Q51. However, it is visually not remarkable as light-out because the signal is a very fast pulse. Therefore, there occurs no flicker of LED1. A52 is a comparator having a reference voltage E100. The comparator A52 detects only those pulse produced by the conduction of transistor Q51 and does not respond to the operation of the above transistor Q40.

From the comparator A52 high level pulse is applied to one-shot multivibrator 156. The one-shot multivibrator generates a high level continuous signal for a determined duration ($\tau$) at every input of the high level pulse to it from A52. When the next pulse is applied to the one-shot multivibrator during the duration time of one high level continuous signal, the determined duration time thereof is renewed starting from the input time of the next pulse. The duration time ($\tau$) is so determined that $\omega_1$ plus $\tau$ is shorter than the pulse period of t1 wherein $\omega_1$ is the maximum time from the generation of t1 to the generation of t3. Thus, the time width of high level of the one-shot multivibrator 156 is $\omega_1+\tau$, which is produced at every period of pulse t1 as shown in FIG. 8F. 157 is also one-shot multivibrator functioning as a differentiation circuit which produces an output only when the output of the one-shot multivibrator 156 is changed from low level to high level. The output of the differentiation circuit 157 is applied to the set input S of RS flip-flop 158. Therefore, the flip-flop is set by pulse t1 and its output becomes high level at the time. Pulse t2 transmitted next to the t1 is applied to the reset input R of the flip-flop 158 through AND gate G40 to reset it. At the time, the output of the flip-flop becomes low level.

Resistor R101 and condenser C22 constitute together a delay circuit for preventing any reset pulse from being transmitted to the flip-flop 158 at t1. Consequently, the output of flip-flop 158 continues to be high level during the time interval ($\omega_2$) between the generation of pulse t1 and the generation of pulse t2 as shown in FIG. 8G. 159 is a reference pulse generator for counting the output time of one-shot multivibrator 156 and flip-flop 158. During the time when the outputs of 156 and 158 are high level, gates G38 and G39 are opened to allow counters 160 and 161 to count the high level output time as the number of pulses.

162 and 163 are data latching circuits. With the change of output level of one-shot multivibrator 156 from high level to low level and after a determined delay time by one-shot multivibrator 164, the data latching circuits 162 and 163 generate data latch pulses by which the contents of counters 160 and 161 are memorized and the previously memorized counter contents are refreshed. After a determined delay time by 165 from the generation of data latch pulse by 164 there is generated counter resetting pulse to reset the counters 160 and 161. After resetting, the counters assume in waiting position for the next counting operation. 166 is a display circuit provided with a display input switching function.

The display circuit 166 drives display devices 167 and 168 while receiving a control signal from the exposure control circuit 1 through Sig-1 line.

In normal photography mode, the display circuit 166 drives display devices 167 and 168 in accordance with the data from the control circuit 1 to make a display of set exposure values such as AV, TV, etc. or a prospective exposure value.

In flashlight photography mode, the display circuit drives the devices 167 and 168 in accordance to the memorized values in the latching circuits 162 and 163 to make a display of distance.

Display is made in the following manner:

When terminals P4, P13 are low level and P11, P12 are high level, the above mentioned pulses t1, t2 and t3 are generated. Following the above described operation, $\omega_1+\tau$ i.e. the maximum object distance or the optimum object distance is memorized in the latch circuit 162. $\omega_2$ i.e. the minimum object distance is memorized in the latch circuit 163. The display devices 167 and 168 make a display of distance according to the memorized values in the latch circuits. When the memorized value in the latch circuit 162 is transmitted to the display circuit 166, the $\tau$ term is always omitted from the memorized $\omega_1+\tau$. When terminal P12 is low level (non-control mode), P4, P13 are low level and P11 is high level, t4 from one-shot multivibrator 152 is substituted for t2 from comparator A51. In this case, time predetermined for the one-shot multivibrator 152 is memorized in the latch circuit 163 and the display circuit 166 discriminates it from others. On the display device 167 there is displayed the optimum distance according to the memorized value in the latch circuit 162. On the other display device 168 there is displayed a character or pictorial symbol indicating the non-control mode, for example, "M" or "MANUAL".

When terminal P4 is high level or when P11 is low level, namely when there is no proper exposure range for flashlight photography or when the level of charge voltage on the main condenser C3 is under the emission enabling voltage level, there are produced only pulse t1 and the output pulse of one-shot multivibrator 155 as pulses for rendering the transistor Q51 conductive. In this case, the state is memorized in the latch circuit 163. Discriminating the state, the display circuit 166 brings the display devices 167 and 168 to the state of display-out.

When terminal P13 is high level, pulses for driving the transistor Q51 are only pulse t1 and the pulse from one-shot multivibrator 154. This state is memorized in the latch circuit 163. Discriminating the state, the display circuit 166 puts the display 167 out and makes a display of "BOUNCE" on the other display device 168. This display is made to indicate that the flashlight unit is used for bounce photography or that the flashlight unit is placed at a position different from the camera position by an extension cord or that the flashlight photography will be carried out with extended flashlight emission. The manner of operation for lighting, on light and flickering of LED1 is the same as described above referring to FIG. 1.

FIG. 9 is a further embodiment of the invention wherein an automatic control circuit is added to the circuit of the electronic flashlight emission unit shown in FIG. 2.

In FIG. 9, like reference characters to FIG. 2 represent the same or corresponding elements.

Switches SW50, SW51, SW53 are interlocked with each other. When the switches are connected to terminal a, TTL control is performed cooperating with the photometering circuit 50 on the camera shown in FIG. 1. When they are connected to another terminal b, flashlight emission is controlled independently of the camera.

180 is a flashlight emission control circuit which carries out the integration of the quantity of emitted light on the basis of the light measuring current by photo receptor PD20 and the values of AV and SV set by variable resistors VR4 and VR5. When the quantity of emitted light has reached a determined level, the control circuit 180 generates an output by which the terminal b of switch SW50 is rendered low level. Therefore, when the switch SW50 is connected to the terminal b, the same control operation as in FIG. 2 is carried out by rendering Q22 conductive. Since the switch SW51 is connected to terminal b, the output of gate G3 is kept at low level. If the camera on which the flashlight emission unit is mounted is not provided with any means for generating signal of (AV−SV) for distance display, then switch SW53 is connected to terminal b to obtain the signal of (AV−SV) by the resistors VR4 and VR5. Therefore, in the case where a camera as shown in FIG. 1 is used, terminal a is selected.

Figure 10:
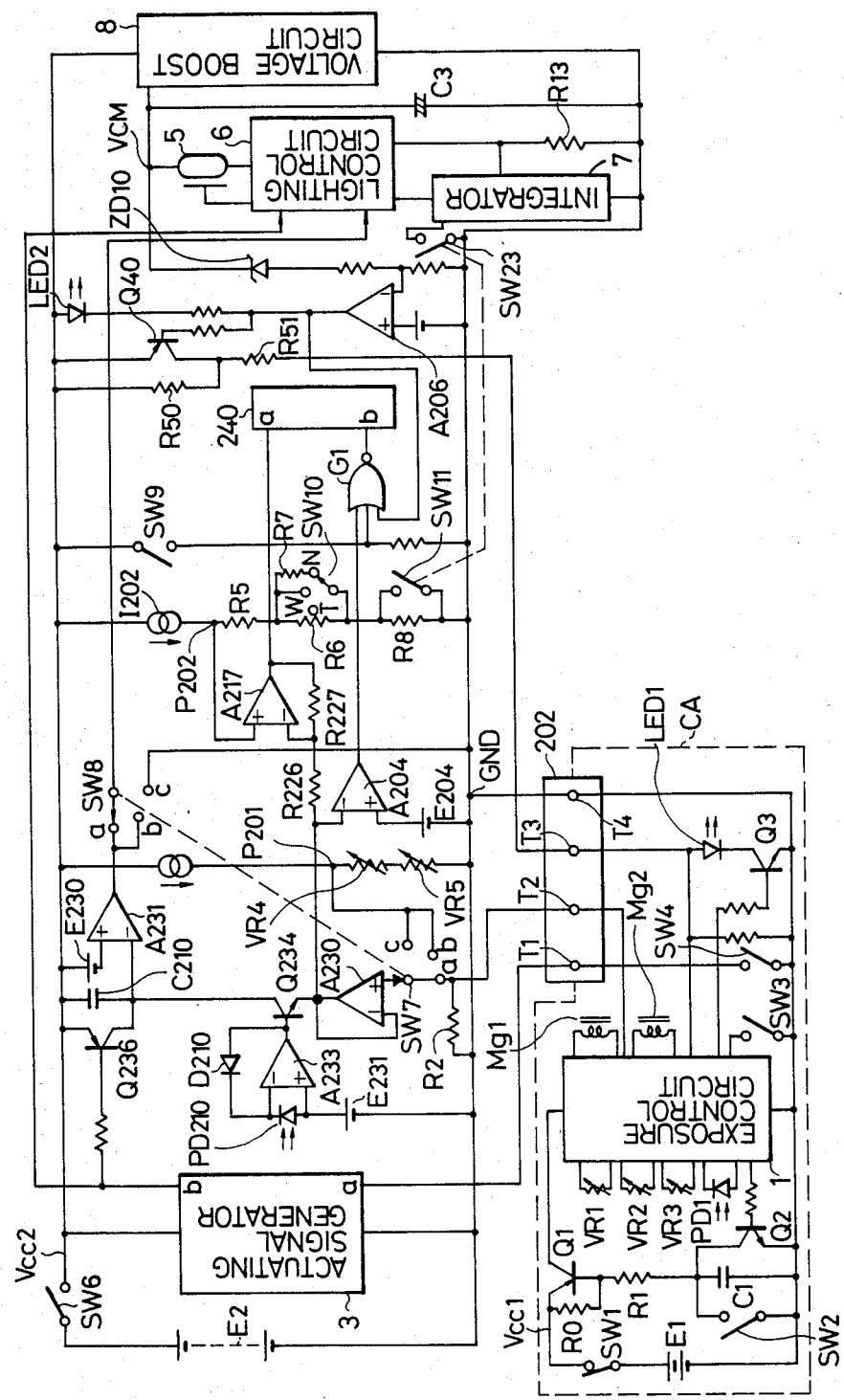
FIG. 10 is a circuit diagram showing the fourth embodiment of the invention.

FIG. 10 shows a further embodiment of the invention. According to this embodiment, such state in which it is better to inhibit the display of object distance is detected and any display of distance is inhibited.

In FIG. 10, like reference characters to FIGS. 1 and 2 represent the same or functionally corresponding elements of which no further description will be made hereinafter.

CA designates the circuit in the camera. The circuit CA on the camera's side is connected to the circuit of the flashlight emission unit by an accessary shoe 202 having four connection terminals T1-T4. Synchro-switch SW4 is connected between the connection terminal T1 and the power supply line GND. The flashlight exposure factor AV−SV calculated by the exposure control circuit 1 is applied to the terminal T2. Similarly to the circuit shown in FIG. 1, transistor Q3 is rendered conductive by a battery checking circuit.

The circuit in the electronic flashlight emission unit includes a control circuit for generating the first emission stop signal. The control circuit is composed of operational amplifiers A230, A233, photo diode PD110, reference voltage sources E230, E231, diode D210, transistors Q234, Q236, and condenser C210. The control circuit operates in the same manner as the circuit 50 in FIG. 1. However, transistor Q236 is controlled by the output from the output terminal b of the circuit 3.

Similarly to the circuit shown in FIG. 9, variable resistors VR4 and VR5 in series give to the connection point P201 a voltage corresponding to the flashlight exposure factor (AV−SV). Flashlight mode selection switches SW7 and SW8 are interlocked with each other and terminals a, a; b, b; c, c are selected at the same time. Terminal a of SW7 is connected to the connection terminal T2 and terminals b and c are connected to the connection point P201. Terminals a and b of SW8 are connected to the output terminal of comparator A231 and terminal c is connected to GND.

The output of operational amplifier S230 is applied to the negative input terminal of A217. Operational amplifier A217, resistors R226, R227, R5-R8, current source I202, switches SW10 and SW11 constitute together a calculating circuit for calculating the effective maximum object distance for which an optimum exposure may be obtained by automatic control. The output voltage of operational amplifier A27 which corresponds to the effective maximum object distance, is transmitted to the display part 240.

To change the range of illumination angle there is usually used an optical adaptor which is mounted on the front surface of the emission part of the flashlight emission unit. The switch SW10 is switchable interlocking with such an optical adaptor. When the lens used is of standard type and no such optical adaptor is used, the switch SW10 is connected to terminal N. When an adaptor to widen the range of illumination angle is used because of short focal length of the lens, the switch SW10 is connected to terminal W. On the contrary, when an adaptor to narrow the range of illumination angle is mounted because of long focal length of the lens, the switch is connected to terminal T.

Switches SW11 and SW23 are interlocked with each other. By closing SW11 and SW23 together, the maximum quantity of emitted light from the flashlight emission unit is limited to a certain selected value.

Let GN-$_{NORMAL}$ denote the guide number of the flashlight emission unit in the case where terminal N is selected by the switch SW10 when the switch SW11 is OFF. Similarly, let GN-$_{WIDE}$ denote the guide number of the unit for terminal W and GN-$_{TELE}$ the guide number of the unit for terminal T. And let GN-$_{NORMAL.D}$, GN-$_{WIDE.D}$ and GN-$_{TELE.D}$ denote the corresponding guide numbers to the above guide numbers when the switch SW11 is ON. Then, GN-$_{WIDE}$<GN-$_{NORMAL}$; GN-$_{WIDE.D}$<GN-$_{NORMAL.D}$<GN-$_{TELE.D}$.

At the time point when the charge voltage on the condenser C3 has just reached the determined level, comparator A206 generates low level output by which the light emitting diode LED2 is lighted up and the transistor Q40 is rendered conductive.

The voltage of reference voltage source E204 of the comparator A204 is set at a level corresponding to a limit value which can not exist in view of the combination of the possible preset aperture value (AV) and the possible sensitivity (SV) of the film used in the camera. Thus, the comparator A204 generates high level output when the voltage at its negative input terminal is lower than that at its positive input terminal.

Output from SW9 and comparators A204, A206 are applied to NOR gate G1. The output of NOR gate G1 is applied to one input terminal b of the display part 240 and the output voltage of operational amplifier A217 is applied to another input terminal a of the display part. When the switch SW10 is switched over from terminal N to W, VA217 out drops down wherein VA217 out is the output voltage obtained when terminal N is selected by SW10 with switches SW11 and SW12 being OFF. On the contrary, when the switch SW10 is switched over from terminal N to T, the output voltage VA217-out rises (providing that (SV−AV) is constant). This means that the output voltage VA217out is level-shifted according to the guide number. Further, when the switch SW11 is closed during the time the switch SW10 connected to any one of the three terminals N, W and T, the output voltage drops down depending on it. As will be understood from the above, since the output voltage VA217out is level-shifted according to the change of guide number, the taking distance D also changed according to it. This output voltage VA217out represents the maximum effective object distance Dmax for which an optimum exposure can be obtained with the maximum quantity of emitted light. Therefore, so long as the object is at a distance shorter than the maximum distance Dmax, an optimum exposure can be obtained by automatic control operation.

Figure 11:
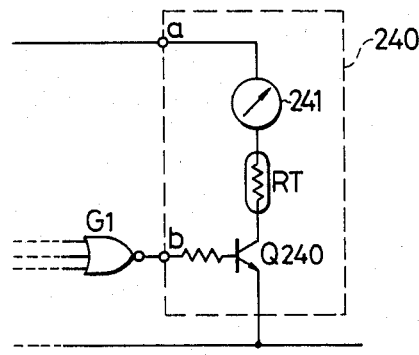
FIG. 11 is a circuit diagram showing the display part of the fourth embodiment shown in FIG. 10.

FIG. 11 shows the detailed arrangement of the display part 240.

In FIG. 11, 241 is an ampere meter, the deflection angle of point of which is proportional to the current flowing into the meter from the terminal a. RT is a temperature compensating resistor having a positive temperature coefficient. As the output voltage VA217out of operational amplifier A217 is proportional to absolute temperature T, the resistor RT prevents the current flowing to the ampere meter 241 from being affected by the change of the output voltage by temperature. Transistor Q240 is blocked off by low level output from NOR gate G1 to block current flowing toward the ampere meter 241.

Figure 12:
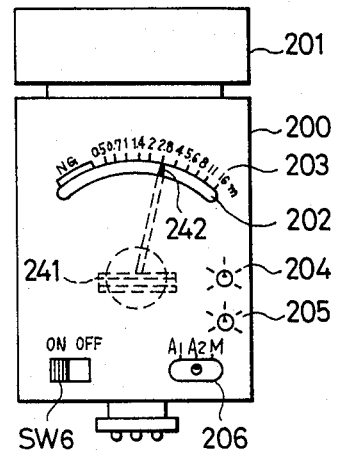
FIG. 12 is an external view of the display part.

As shown in FIG. 12, the flashlight emission unit has a casing 200 on which the emission part 201 of the unit is mounted for vertical and horizontal rotation. The ampere meter 241 is received in the housing 200. By rotating the emission part 201 from the regular position shown in FIG. 12, the switch 9 shown in FIG. 10 is closed (switch ON). The pointer 242 of the ampere meter is externally observable through a window 202 provided on the backside wall of the housing 200. In the vicinity of the window 202 there is provided a distance scale graduated proportionally to the logarithm of distance. The angular distance between graduations is the same. The pointer 242 rotates clockwise with increase of current entering the meter. When there is no current flowing into the meter, the pointer stays in "NG" zone. 204 and 205 are dial buttons interlocked with the variable resistors VR4 and VR5 shown in FIG. 10. The dial buttons 204 and 205 are used to set film sensitivity and aperture value respectively. 206 is a change-over knob interlocked with switches SW7 and SW8. Gradations A1, A2 and M of the knob correspond to the terminals a, b and c of the switches respectively.

In the position where switches SW7 and SW8 are connected to terminal a and switches SW11 and SW12 are open, and before depressing the release button (transistor Q1 is non-conductive), there is no voltage applied to the operational amplifier A230 from the control circuit 1 through terminal T2 and switch SW7 even when both power source switches SW1 and SW6 are closed in this position of the circuit. Therefore, in this case, the output voltage of A230 is zero and the comparator A204 has high level output. NOR gate G1 generates low level output. At the display part 240, the transistor Q240 is non-conductive because of the low level state of terminal b. Therefore, the pointer 242 of the ampere meter 241 points to "NG" zone to indicate that the preparation for flashlight photography has not yet been completed i.e. that the flashlight unit has not received any exposure factor from the camera.

By depressing the release button to the first stroke, the switch SW2 is closed and therefore transistor Q1 is rendered conductive. Now the circuit 1, namely the operational amplifier A230 generates an output voltage VA230out. Comparator A204 generates low level output. In this position, comparator A206 generates low level output when charging of main condenser C3 has been completed. If the switch SW9 is opened for normal flashlight photography and is generating low level output at this time, then NOR gate G1 generates high level output. Thereby the display part shown in FIG. 11 is driven to make a display of the effective maximum object distance which corresponds to any one of GN-$_{NORMAL}$, GN-$_{WIDE}$ and GN-$_{TELE}$. The photographer checks whether the distance preset by use of the focusing ring of the lens is smaller than the displayed distance. If it is not, the photographer changes the taking position so as to bring the object distance to a value within the range of allowable value now being indicated by the display part. When the set distance is within the indicated range, the photographer depresses the release button further.

By depressing the release button up to the second stroke, the camera shutter is released. Then, at a determined timing, the synchro-switch SW4 is closed and the actuating signal generator 3 generates low level output from its output terminal b. In response to it, the lighting control circuit 6 drives the flash discharge tube 5 to start the emission of flashlight. At the same time, transistor Q236 is blocked and therefore the condenser C210 is charged with the collector current of transistor Q234. When the charge voltage on the condenser C210 has reaches the level of the reference voltage E230, comparator A231 generates high level output which is applied to the lighting control circuit 6 through switch SW8. In response to it, the lighting control circuit terminates the emission of light from the discharge tube 5. In this manner, an automatic flashlight output control is performed.

In the position of the circuit where SW7, SW8 are connected to terminal a and SW11, SW12 are closed, essentially the same operation as above is carried out for distance display. However, in this case, the distance displayed by the display part corresponds to GN-$_{NORMAL.D}$, GN-$_{WIDE.D}$ or GN-$_{TELE.D}$ because of the switches SW11, SW12 being ON. The flashlight photographing is performed in combination mode of automatic control and limited emission by the integrator 7.

In case that the camera is not provided with means for generating or transmitting the flashlight exposure factor (AV−SV), the switches SW7, SW8 have to be connected to terminal b. Then, sensitivity SV of the film loaded in the camera and desired lens aperture AV are set by use of variable resistors VR4 and VR5 respectively. The operational amplifier A230 generates an output voltage in accordance with the above described relation. Thus, in the same manner as above, a display of effective maximum object distance is made according to the output voltage from the operational amplifier A217. When the release button is depressed to the second stroke, a control operation is performed relying on the values of AV and SV preset by VR4 and VR5.

In the position of the circuit wherein switches SW7 and SW8 are connected to terminal c, the output of comparator A231 (the first emission stop signal) can not be transmitted to the lighting control circuit 6. Therefore, in this case, no automatic control operation is possible. The discharge tube 5 emits light in the quantity determined by GN-$_{NORMAL}$, GN-$_{WIDE}$ or GN-$_{TELE}$ when the switch SW12 is OFF. When SW12 is ON, the discharge tube emits light in the quantity determined by GN-$_{NORMAL.D}$, GN-$_{WIDE.D}$ or GN-$_{TELE.D}$. In this operation mode, the data of AV preset by VR4 and SV preset by VR5 are transmitted to the operational amplifier A230 through switch SW7. Therefore, the operational amplifier generates an output voltage VA230out which is applied to the display part. The display part makes a display of the object distance for which an optimum exposure may be obtained. However, in this mode different from the above ones, the displayed distance represents only distance suitable for the optimum exposure. This is because no automatic control is carried out in this case. Therefore, the photographing with flashlight must be carried at the displayed object distance. Otherwise, if the distance now being indicated by the display part is different from the desired distance, the photographer has to read just the variable resistor VR4 until the desired distance is displayed on the display part. After it is attained, the photographer sets anew the aperture value by use of the preset ring of the lens.

When switch SW9 is closed, the display part 240 does not display any distance. It is therefore advisable that switches SW7 and SW8 be connected to terminal b when the switch SW9 is to be closed. By doing so, there can be obtained proper exposure by automatic control operation.

Figure 13:
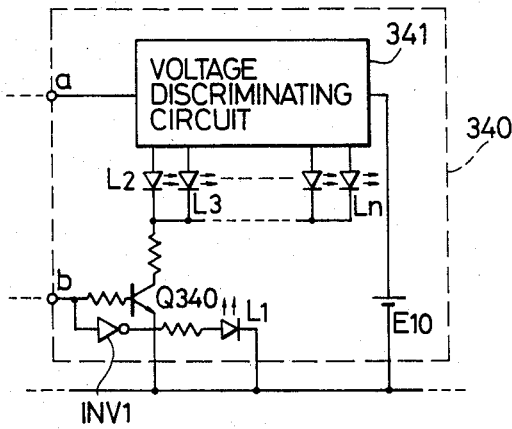
FIG. 13 is a circuit diagram showing a modification of the display part shown in FIG. 10.
Figure 14:
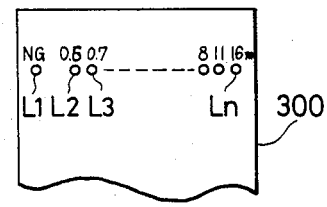
FIG. 14 is an external view of a display made by the modification shown in FIG. 13.

FIGS. 13 and 14 shows another embodiment of the display part.

The display part 340 according to this embodiment includes a voltage discriminating circuit 341. The circuit selectively activates light emitting diodes L2-Ln according to the voltage appearing at terminal a. Based on the voltage of a reference voltage source E10, the circuit 341 generates a reference voltage for discrimination. The reference voltage source E10 is given a proportional characteristic to absolute temperature.

When NOR gate G1 generates high level output, transistor Q340 is rendered conductive so that any one of L2-Ln becomes possible to light up. The transistor Q340 is blocked by low level output of NOR gate G1 to put the light of L2-Ln out. On the other hand, at the time an inverter INV1 generates high level output by which the light emitting diode L1 is lighted. As shown in FIG. 14, a mark "NG" is provided for L1 and distance graduations are given to L2-Ln respectively. Therefore, from the position of the diode now lighting up, the photographer can know the effective maximum object distance or unsuitability of flashlight photography.

We claim:

1. In a flashlight emission apparatus having means for lighting a flash tube to illuminate an object to be taken and means for controlling the quantity of emitted light from said flash tube, said apparatus being cooperative with a camera having means for generating preset information of ASA speed value of a film and aperture value of the taking lens prior to taking, the improvement provided with a device for making a display of the limit of object distance for providing an optimum exposure to said film by the emitted light controlled by said control means, the device comprising:
   (a) means for receiving said preset information from said camera to provide first data corresponding to the received information;
   (b) means for providing second data substantially identical with said first data;
   (c) means for providing third data indicative of the limit of the quantity of emitted light controllable by said control means;
   (d) selection means for selecting one data from the first data and second data;
   (e) means for forming an output corresponding to said limit of object distance from said selected one and third data; and
   (f) means for effecting a visual display of said limit of object distance in response to the output of said output forming means.

2. Flash light emission apparatus cooperative with a camera in flashlight phototaking, the camera generating preset information of ASA speed value of a film and aperture value of a taking lens, the apparatus comprising:
   (a) means for receiving said preset information from said camera to provide first data corresponding to the received information;
   (b) means for providing second data substantially identical with said first data;
   (c) selection means for selecting one data from the first data and second data;
   (d) means provided with means which generates during the flashlight phototaking a photometering output corresponding to the quantity of light from an object to control the quantity of emitted light from said flashlight emission apparatus in response to said one data selected by said selection means and said photometering output;
   (e) means in response to said one data selected by said selection means for forming prior to said flashlight phototaking an output corresponding to the limit of object distance to provide an optimum exposure; and
   (f) means for effecting a visual display of said limit of object distance in response to the output of said output forming means.

3. A flashlight emission apparatus as set forth in claim 2 further comprising means for forming a third data indicative of the limit of quantity of the emitted light from said flashlight emission apparatus, wherein said output forming means forms said output in response to said one data and said third data.

4. A flashlight emission apparatus cooperative with a camera in flashlight phototaking, the camera generating preset information of ASA speed value of a film and also generating a first emission stop signal when emitted light from a flash tube reaches a value determined by said preset information, the apparatus comprising:
- (a) means for receiving said preset information from said camera to provide first data corresponding to the received information;
- (b) means for providing second data substantially identical with said first data;
- (c) means provided with means which generates during said flashlight phototaking a photometering output corresponding to the quantity of light from an object to generate a second emission stop signal when said photometering output reaches a value determined by said second data;
- (d) selection means for selecting one data from the first data and second data;
- (e) means for stopping the light emission in said flash tube in response to said first emission stop signal from said camera when said first data is selected and in response to said second emission stop signal from said generating means when said second data is selected, respectively;
- (f) means in response to said one data selected by said selection means for forming prior to said flashlight phototaking an output corresponding to the limit of object distance to provide an optimum exposure; and
- (g) means for effecting a visual display of said limit of object distance in response to the output of said output forming means.

5. A flashlight emission apparatus cooperative with a camera in flashlight photographing for controlling a quantity of light emitted from a flash tube which is energized by an electric charge from a main capacitor to provide an optimum exposure in taking an object illuminated by light; the apparatus comprising:
- (a) means for forming a correction output changeable according to the quantity of the electric charge of said main capacitor;
- (b) means for detecting the charged voltage on said main capacitor;
- (c) means for inputting information relating to ASA speed value and aperture value;
- (d) means for producing an operation output corresponding to the limit of object distance for providing an optimum exposure under the quantity of emitted light depending upon the quantity of the electric charge of said main capacitor based on said correction output and said information relating to ASA speed value and aperture value; and
- (e) means for effecting a visual display of the limit of object distance in response to the operation output, said display means in response to said detecting means being enabled while the charged voltage of said main capacitor is exceeding a threshold level necessary for lighting said flash tube and being disabled while the charged voltage is not exceeding said threshold level.

6. A flashlight emission apparatus as set forth in claim 5 wherein said correction output forming means includes means for providing a flow of current in magnitude corresponding to the charge voltage of said main capacitor and means for converting said flow of current into a logarithmically compressed voltage.

7. A flashlight emission apparatus cooperative with a camera for flashlight photographing and having an electric circuit for controlling the quantity of emitted light from said flash tube for providing an optimum exposure for taking the object with the flashlight, said apparatus comprising:
- (a) means for inputting information relating to ASA speed value and aperture value;
- (b) means for forming a first output corresponding to the minimum object distance at which the control of the quantity of the emitted light by said electric circuit is possible for providing the optimum exposure, said first output being formed based on said input information;
- (c) means for forming a second output corresponding to a determined minimum object distance at which said object can be illuminated uniformly by said flashlight emission apparatus;
- (d) means for selecting one of the first and second outputs which represents a larger distance, and putting out said selected one; and
- (e) means for effecting a visual display of said minimum distance in response to the output from said selection means.

8. A flashlight emission apparatus cooperative with a camera for flashlight photographing and controlling the quantity of the light emitted from said flash tube to illuminate an object to be taken in an optimum exposure with the flashlight, said apparatus comprising:
- (a) means for inputting information relating to ASA speed value and aperture value;
- (b) means for forming a first output corresponding to a determined minimum object distance at which said object can be uniformly illuminated by said flashlight emission apparatus, said first output being formed based on said input information;
- (c) means for forming a second output corresponding to the maximum object distance at which the flashlight can be controlled for providing the optimum exposure, said second output being formed based on said input information;
- (d) means for making a display of at least one of said minimum distance and maximum distance in response to at least one of said first and second outputs; and
- (e) means for comparing said first output with said second output and generating a signal only when said minimum distance is larger than said maximum distance.

9. A flashlight emission apparatus as set forth in claim 8, which further comprises means for providing a warning display in response to said signal.

10. A flashlight emission apparatus as set forth in claim 8, wherein said display means includes means for cancelling the display in response to said signal.

11. A flashlight emission apparatus having a flash tube able to emit light to illuminate an object to be taken and means for controlling the quantity of emitted light from said flash tube to provide an optimum exposure for taking the object with the flashlight, and being cooperative with a camera including means for setting a taking distance according to the object distance for the flashlight photographing, said apparatus comprising:
- (a) means for inputting information relating to ASA speed value and aperture value;
- (b) means for calculating the maximum and minimum object distances at which the emitted light can be controlled for providing the optimum exposure by the flashlight photographing, said calculation being based on said input information;

(c) means for introducing the taking distance set by said setting means into said flashlight emission apparatus from said camera;
(d) first checking means for verifying that said introduced taking distance is between said maximum distance and said minimum distance;
(e) switching means operable to cancel the control of the quantity of emitted light by said control means; and
(f) second checking means responsive to the operation of said switching means for verifying that said introduced taking distance is substantially equal to said maximum distance.

12. A flashlight emission apparatus as set forth in claim 11, which further comprises means for selectively effecting a display of the result given by said first checking means or the result given by said second checking means in response to the operation of said switching means.

13. A flashlight emission apparatus as set forth in claim 12, which further comprises;
capacitor means for storing electric charge to be used for lighting said flash tube;
detection means for continuously generating an output until the storing of the charge in said capacitor means is completed; and
means for cancelling the display of the result given by said second checking means in response to the output of said detection means.

14. A flashlight emission apparatus as set forth in claim 12, which further comprises capacitor means for storing electric charge to be used for lighting said flash tube and means for detecting the voltage on said capacitor means, and wherein said calculating means includes means responsive to said detection means to correct the calculated maximum distance.

15. In a camera cooperative with a flashlight emission apparatus for exposing a photosensitive film to light, the improvement comprising a device for output of information used to control the light-emission from said flashlight emission apparatus, said information output device including:
(a) means for generating first information corresponding to ASA speed value and aperture value set by an ASA film-speed value setting means and aperture value setting means contained in said information generating means;
(b) means for measuring the quantity of light transmitted through a taking lens of the camera during the light-emission from said flashlight emission apparatus and generating second information when the measured quantity of light reaches a determined value;
(c) an electric output terminal for connection with said flashlight emission apparatus;
(d) releasing means operated for starting the exposure of film; and
(e) means for selectively connecting said first and second information generating means with said output terminal, said connecting means selecting said first information before said releasing means is operated and selecting said second information during the time from the operation of said releasing means at least to the completion of the exposure.

16. Apparatus as set forth in claim 15, wherein said flashlight emission apparatus includes:
an input terminal to be connected with said output terminal of the camera;
a flash tube;
means for controlling the quantity of emitted light from said flash tube;
means for forming a signal indicative of the limit of the quantity of emitted light controllable by said control means; and
means for calculating the limit of object distance at which an optimum exposure for said film is obtainable under the control of emitted light by said control means, said calculation being made from said signal and said first information introduced from said input terminal.

17. A camera provided with apparatus for automatically controlling exposure factor in accordance with the brightness of an object to be taken to provide an optimum exposure for photographing without flashlight, which camera can be used also for flashlight photographing when it is connected with a flashlight emission apparatus having a flash tube able to emit light to illuminate the object and means for controlling the quantity of emitted light from said flash tube so as to provide as optimum exposure, said camera comprising:
(a) first means for generating first information relating to the exposure factor to be controlled by said control apparatus for photographing without flashlight;
(b) second means for generating second information relating to the limit of object distance at which the control of the quantity of emitted light by said control means of said flashlight emission apparatus is possible to obtain the optimum exposure; and
(c) display means having a display member which can be driven selectively in a first mode to make a visual display of said exposure factor and in a second mode to make a visual display of said limit of object distance, said display means driving said display member in the first mode in response to said first information and in the second mode in response to said second information.

18. A camera as set forth in claim 17, wherein said flashlight emission apparatus includes means for calculating said limit of object distance and wherein said second means is connected with said calculating means by connecting said flashlight emission apparatus with said camera and generates information of the calculated limit of object distance as said second information.

19. A camera as set forth in claim 18, wherein said calculating means of said flashlight emission apparatus includes means for generating a series of pulse signals having a period corresponding to said limit of object distance.

20. A camera as set forth in claim 19, wherein said flashlight emission apparatus includes capacitor means for accumulating the electric charge to be used to cause said flash tube to emit light, means for producing a detection signal in response to the accumulation of the electric charge in the capacitor means, and transmission means having an output terminal and adapted to apply to said output terminal said series of pulse signals with said detection signal superimposed thereon, and wherein said camera includes a terminal to be connected with said output terminal of said transmission means.

* * * * *

UNITED STATES PATENT AND TRADEMARK OFFICE
CERTIFICATE OF CORRECTION

PATENT NO. : 4,494,851
DATED : January 22, 1985
INVENTOR(S) : OSAMU MAIDA, ET AL.

It is certified that error appears in the above-identified patent and that said Letters Patent is hereby corrected as shown below:

On the title page; Item [30], line 2, "56/174926" should be --56/174929--.

Column 1, line 67, delete "always".

Column 4, line 51, after "the" (first occurrence) insert --mirror-up--.

Column 6, line 66, after "lens" insert --.--.

Column 7, line 43, delete "to"; same line, after "5" insert --to--;

line 45, change "makes" to --causes--; same line, after "tube" insert --to--.

Column 14, line 30, change "$P_{-12}$" to --$P_{0-12}$--.

Column 28, line 23, delete "in".

Column 29, line 17, change "on" to --no--.

Column 31, line 20, before "connected" insert --is--.

Signed and Sealed this

Twenty-fifth Day of June 1985

[SEAL]

Attest:

DONALD J. QUIGG

*Attesting Officer*  *Acting Commissioner of Patents and Trademarks*